United States Patent [19]
Bolstad et al.

[11] Patent Number: 5,630,154
[45] Date of Patent: May 13, 1997

[54] PROGRAMMABLE SYSTOLIC ARRAY SYSTEM ARRANGED IN A FOUND ARRANGEMENT FOR PASSING DATA THROUGH PROGRAMMABLE NUMBER OF CELLS IN A TIME INTERLEAVED MANNER

[75] Inventors: Gregory D. Bolstad, Orange; Kenneth B. Neeld, Fountain Valley; Charles J. Robie, Fullerton; John R. Staub, Corona, all of Calif.

[73] Assignee: Hughes Aircraft Company, Los Angeles, Calif.

[21] Appl. No.: 321,278

[22] Filed: Oct. 11, 1994

[51] Int. Cl.$^6$ ............................... G06F 15/16; G06F 15/82
[52] U.S. Cl. ........................... 395/800; 395/878; 395/280; 364/231.9; 364/229.4; 364/258; 364/DIG. 1; 342/159
[58] Field of Search ........................ 395/800, 182.06, 395/878, 280; 367/121; 342/159; 364/DIG. 1

[56] References Cited

U.S. PATENT DOCUMENTS

| | | | |
|---|---|---|---|
| 4,588,255 | 5/1986 | Tur et al. | 385/24 |
| 4,967,340 | 10/1990 | Dawes | 395/800 |
| 4,980,870 | 12/1990 | Spivey et al. | 367/121 |
| 5,018,065 | 5/1991 | McWhirter et al. | 395/800 |
| 5,105,425 | 4/1992 | Brewer | 395/182.06 |
| 5,179,714 | 1/1993 | Graybill | 395/800 |
| 5,274,832 | 12/1993 | Khan | 395/800 |
| 5,294,933 | 3/1994 | Lee et al. | 342/159 |

OTHER PUBLICATIONS

"MUSE—A Systolic Array for Adaptive Nulling with 64 Degrees of Freedom, Using Givens Transformations and Wafer Scale Integration," C. M. Radar, et al., Massachusetts Institute of Technology, Lincoln Laboratory, Technical Report 886, 18 May 1990.

"The CORDIC trigonometric computing technique," J. E. Volder, *IRE Trans. Electron. Comput.*, vol. EC–8, No. 3, 1959, pp. 330–334, Sep. 1959.

"Matrix Computations," G. H. Golub et al. The Johns Hopkins University Press, 2nd Ed. 1989, pp. 211–219.

"The Algebraic Eigenvalue Problem," J. M. Wilkinson, Oxford University Press, 1965, pp. 131–139, 152–162.

*Primary Examiner*—Meng-Ai T. An
*Attorney, Agent, or Firm*—G. S. Grunebach; M. W. Sales; W. K. Denson-Low

[57] ABSTRACT

A linear systolic array of computation cells, each cell having several vector rotation stages. These stages are programmable to provide efficient implementation of a variety of matrix algorithms. All data movement between cells is via parameterized data packets, and the full linear systolic array is completely data flow driven at the packet level. Physical computation cells can be mapped to act as one or more logical computation cells, allowing a small array to function logically as a larger array through a logical folding. This mapping also allows defective cells to be bypassed for fault tolerance. The array can be used to compute adaptive weights in digital beamforming radar applications.

30 Claims, 15 Drawing Sheets

PROGRAMMABLE SYSTOLIC ARRAY SYSTEM ARRANGED IN A FOUND ARRANGEMENT FOR PASSING DATA THROUGH PROGRAMMABLE NUMBER OF CELLS IN A TIME INTERLEAVED MANNER

TECHNICAL FIELD OF THE INVENTION

This invention relates to computation systems for performing extremely high throughput matrix arithmetic operations on linear systems of equations in real time.

BACKGROUND OF THE INVENTION

The computation of the adaptive weight vectors is one of the most difficult of signal processing algorithms used to implement large scale adaptive processing systems. This is due to extremely high computation rates, large dynamic range, and low latency requirements imposed on these systems. For typical adaptive systems, the computation of the adaptive weights requires 50 to 150 GFLOPS of computational throughput. This type of high-throughput adaptive processing calls for special purpose hardware to achieve high efficiency that fully exploits the parallel nature of the adaptive weight computation process.

Current adaptive signal processing research focuses on what is known as the optimal least squares solution to the general adaptive array nulling problem. It is estimated that signal processing for the least squares problem will dominate all other functional requirements for adaptive radar systems in the near future. This dominance occurs as a direct result of the algorithm throughput requirement, which is proportional to the cube of the number of sensor elements in the system. It is estimated that, in many systems, over 90% of the total signal processing load will be dedicated to this function alone. No currently available general purpose signal processing devices or architectures will provide the throughput without the penalty of large card or module counts.

A key application of adaptive least squares computation is in the calculation of beamforming weight vectors for optimal interference suppression (i.e., jamming, multipath) in advanced multi-channel radar, sonar, and adaptive communications systems. However, the same technology is generally applicable to any system that must quickly generate large sample covariance matrices and perform large-scale matrix inversion operations (Least Squares applications).

Previous techniques for finding solutions for these systems have used either a hardwired, non-programmable systolic array approach, or more commonly, programmable digital signal processor (DSP) or microprocessor approaches. The hardwired logic methods can be very efficient, but are quite inflexible. Approaches using multiple programmable DSP devices (such as those from Texas Instruments, Motorola, etc.) are very flexible, but suffer from poor efficiency and high computation latencies, primarily due to the large number of DSP devices that must be utilized to achieve the necessary arithmetic throughput. Although a processor embodying the present invention can be implemented as a highly optimized systolic array, it retains much of the flexibility of a programmable data-flow system, allowing efficient implementation of algorithm variations.

A version of a hardwired linear systolic array of processors, called MUSE, was developed at Massachusetts Institute of Technology Lincoln Laboratory, as described in "MUSE—A Systolic Array for Adaptive Nulling with 64 Degrees of Freedom, Using Givens Transformations and Wafer Scale Integration," Technical Report 886, 18, May 1990. The MUSE array specializes in real-time adaptive antenna nulling computations for a 64 degree-of-freedom ("DOF") sidelobe canceller radar system. The MUSE architecture consists of a linear systolic array of vector rotation cells that perform voltage domain Cholesky factorization of a sample covariance matrix using a series of Givens transformations. The MUSE then partially backsolves the Cholesky factor for an adaptive weight vector using a fixed sidelobe canceller steering constraint.

Although the MUSE architecture does attack the side-lobe canceller problem, there are some limitations that prohibit its use in a more general RLS and signal processing applications. The MUSE architecture uses a fixed steering constraint, specific to a sidelobe canceller radar system, for the computation of adaptive weights. In addition, MUSE only partially solves for these adaptive weights, requiring external processing hardware to compute the final result. Further, the MUSE architecture operates only on a fixed 64 degree-of-freedom problem size, and cannot be used efficiently on other problem sizes. In order to solve general linear system problems, a method of computing weights from a general constraint is needed. If these weights could be computed within the systolic array, the dependency on external processing could be eliminated.

Another limitation of the MUSE architecture is its inability to perform Cholesky factor downdating. Downdating consists of subtracting off contributions of old data samples from the Cholesky factor as new ones are added. This is useful for implementing sliding window functions on the input data, a function necessary in many signal processing applications. The MUSE architecture operates in a mode where the Cholesky factor is continuously updated. A constant forgetting factor is implemented that acts as an exponentially decaying window on the input data. Although this performs adequately in some applications, it imposes limitations on the types of processing that can be performed.

SUMMARY OF THE INVENTION

The processor in accordance with the invention is fully programmable, uses a floating point arithmetic format, does the full job of computing adaptive weights for a general adaptive array radar (not just a sidelobe canceller), and has the flexibility to be used in many different applications other than adaptive radar beam-forming. The programmable controller/sequencer, the data-flow driven control approach, the logical/physical cell mapping (allowing multiple array folding), and the variable cell latency provide this algorithm flexibility, and also allow the system to be used for problems of varying sizes and of varying computation requirements.

A programmable processor system embodying the invention is for performing extremely high throughput matrix arithmetic operations on linear systems of equations in real time. The processor system includes a linear systolic array of computation cells, each cell comprising a plurality of vector rotation stages, and programmable means responsive to configuration data to configure respective cells according to the configuration data. The configuration data determines which cells are operational during the arithmetic operations, wherein the linear array is programmable in length.

The data connections between adjacent ones of the computation cells are local connections, wherein the system does not require a global data bus interconnecting the computation cells. Moreover, during array operation, all information passed between the computation cells is in the form of packets. The computation cells comprise means for recognizing and responding to a plurality of different types of packets. The packets are in the form of digital data packets and have a structure comprising a header defining the packet type, and one or more data words of a predetermined bit length.

Each computation cell includes a microcode sequencer for controlling operation of the cell, and a multi-function random access memory storage function for providing temporary storage of data under control of the sequencer.

The computation cells are programmably arranged in a folded arrangement wherein data is passed successively through a programmable number of the cells in a first direction and back through the cells in a second direction in a time interleaved manner.

An exemplary application for the processor array is in an adaptive beamforming system, comprising:

- a sensor array for providing sample vectors of sensor sample signals from sensor devices comprising the array;
- a source of one or more steering vectors each defining a steering direction;
- an initialization device for providing a set of initialization data parameters;
- a processor array responsive to the sample vectors, the one or steering vectors and the set of parameters for computing adaptive weights to be applied to the sample vectors for each steering vector;
- means for providing delayed replicas of the sample vectors; and
- beamforming means for applying said adaptive weights to said delayed replicas of the sample vectors to result in optimally formed beams;
- the processor array comprising a linear systolic array of computation cells, each cell comprising a plurality of vector rotation stages, and programmable means responsive to the set of initialization data parameters to configure respective cells according to the set of data parameters, the set determining which cells are operational during the arithmetic operations, wherein the linear array is programmable in length.

A plurality of the sample vectors are input to the processing array in a serial manner, the computation cells comprise means for computing a voltage domain matrix for the sample vectors, and the processor array comprises backsolving means responsive to the voltage domain matrix and the one or more steering vectors for computing the weight vector for each the steering vector.

The processor architecture in accordance with the invention has several greatly expanded capabilities as compared to the MUSE architecture, and a result, is applicable to real-world problems:

1) It is easily adapted to various problem sizes—as opposed to a fixed 64 DOF problem.
2) It can solve for multiple general steering constraints—as opposed to a single CSLC steering constraint.
3) It solves for adaptive weights directly—without external processing.
4) It performs Cholesky downdating using hyperbolic rotations.
5) It has programmable correction (forgetting) factors.

BRIEF DESCRIPTION OF THE DRAWING

These and other features and advantages of the present invention will become more apparent from the following detailed description of an exemplary embodiment thereof, as illustrated in the accompanying drawings in which.

DETAILED DESCRIPTION OF THE PREFERRED EMBODIMENT

Figure 1:
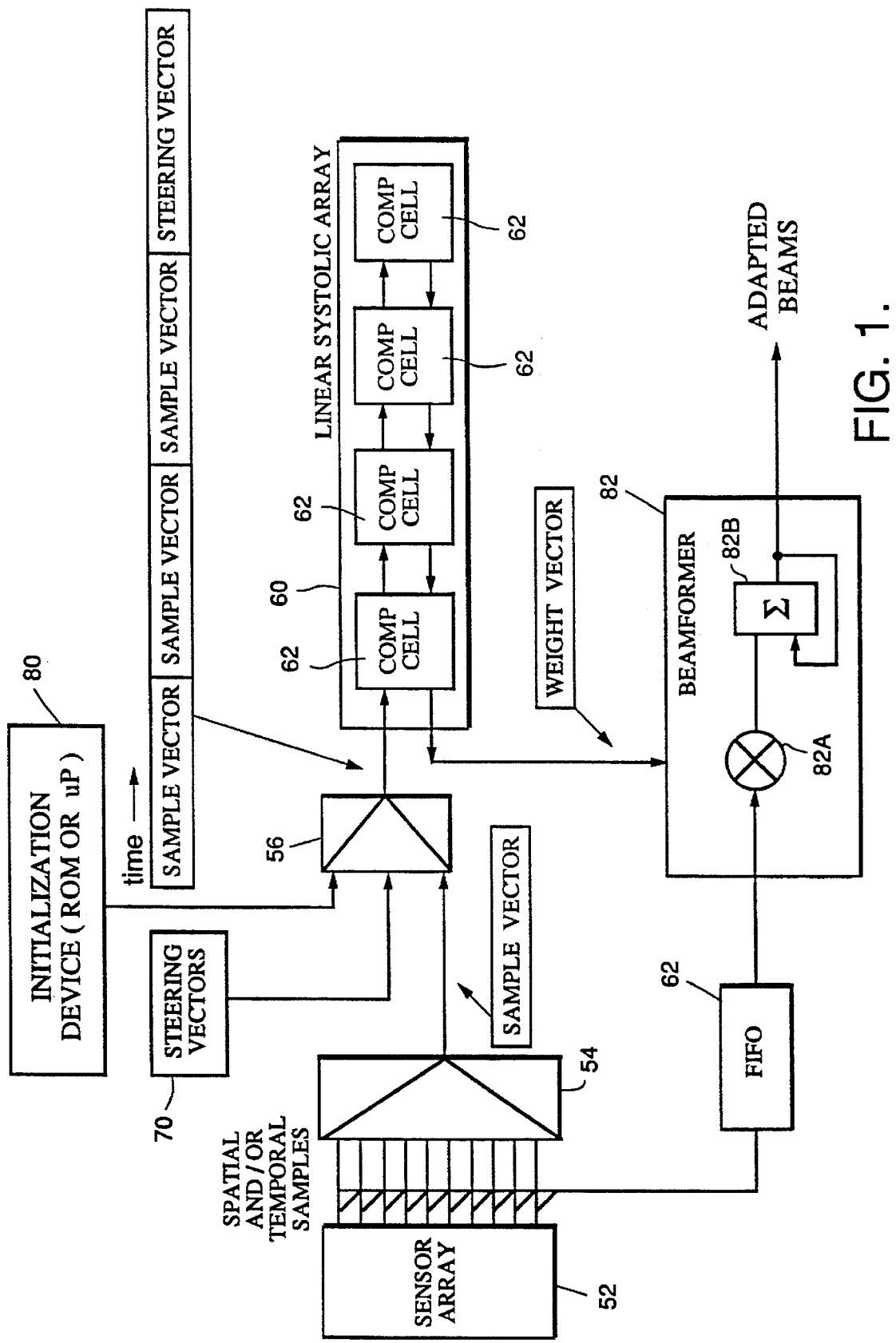
FIG. 1 is a simplified block diagram of an adaptive beamforming system embodying the present invention.

A processor in accordance with one aspect of this invention includes a linear systolic array of vector rotation cells that perform a voltage domain Cholesky factorization of a sample covariance matrix using Givens rotations. Complex vectors consisting of samples of element data are passed through the array where they are used to update the internally stored Cholesky matrix. When the Cholesky matrix has been updated with a sufficient number of data samples, a backsolve operation is performed automatically, using multiple general steering constraints, which produces corresponding optimum weight vectors.

The processor may be configured via downloadable parameters to meet a variety of system requirements, and is organized as a data flow architecture where control information is passed through the pipeline along with the data. The control information is used to select various functions including system initialization, self test, Cholesky matrix preload, forgetting factor initialization, circular and hyperbolic Cholesky updates, and backsolve operations. The number of degrees of freedom and steering vectors are selectable. An initialization circuit determines the optimum data interleaving, buffering, and memory allocation required to minimize latency in the systolic array.

The processor may also be commanded to perform an extensive self-test in which the entire pipeline and all memories are tested. In addition to the normal Cholesky update and backsolve operations, the processor can be instructed to preload the Cholesky factor, select a new forgetting factor, and perform hyperbolic down-dating of the Cholesky factor. The forgetting factor and down-dating functions are used to implement sliding and exponentially decaying windows in relation to the sample data.

Internally, an exemplary processor embodying this invention uses an IEEE floating point format to represent data moved between rotation cells (and between application specific integrated circuits (ASICs) on which the cells are fabricated), while internal to the rotation cells the data is converted to a B fixed point format. Upon exiting the S stage rotation cells, the data is magnitude corrected and re-normalized to IEEE floating point.

The processor is a special purpose processor capable of providing extremely high computation throughput for certain matrix computations. While this substantial processing capability is not available for general purpose operations, it is applicable to one of the most computationally intensive parts of the adaptive beamforming problem, i.e., QR factorization and Singular Value Decomposition (SVD) based adaptive weight calculation processes. The factorization of a matrix A is given by A=QR, where Q is orthogonal and R is upper triangular.

An exemplary processor in accordance with the invention is a systolic array designed specifically to compute the Cholesky factor (a QR factorization process) of a sample covariance matrix using a voltage domain method—i.e., without ever explicitly computing the sample co-variance variance matrix. The processor can also back solve and forward solve for multiple general constraints. These features allow the processor to be quite useful in the solution of a set of adaptive weight vectors to be used in a beamforming process or other similar over determined least-squares problem. This exemplary embodiment also permits (equivalent) diagonal loading of the sample covariance matrix by allowing an arbitrary initialization of the Cholesky factor. However, the processor can perform other functions. Its QR factorization and backsolve capabilities can be used to accelerate many matrix computation processes such as Eigenvalue Decomposition and SVD.

SVD is a powerful technique that is well suited to adaptive beamforming since it allows the interference space and noise space to be easily separated without making assumptions of the rank of the system or artificially increasing the noise floor (as with diagonal loading). The SVD of a matrix can be easily computed with alternate right and left applications of the QR factorization processes. This is not the standard manner in which the SVD of a matrix is computed since the standard methods operate in a manner that is more computationally efficient for a single processor. However, using an iterative QR factorization method has advantages when performing the SVD with the systolic array embodying this invention. Furthermore, it has been demonstrated that this approach has similar numerical and convergence properties as the more traditional SVD methods. Much of the processing associated with algorithms such as SVD, eigenvalue decomposition, and rank revealing consists of multiple QR factorization problems. Thus, the processor also has the potential to act as an accelerator for these algorithms where it can substantially improve total system performance.

EXAMPLE SYSTEM APPLICATIONS OF THE INVENTION

Figure 2A:
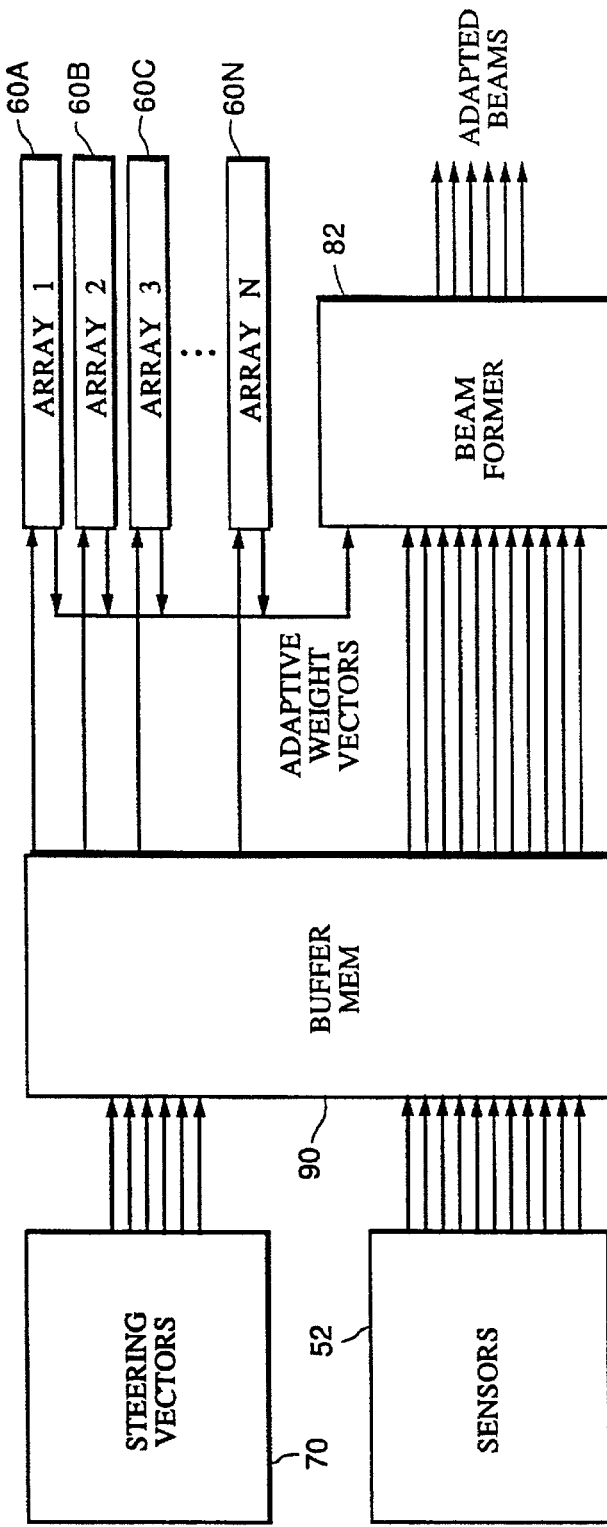
FIG. 2A is a simplified block diagram of a generalize processor array in accordance with the invention.

FIGS. 1 and 2 show two exemplary system applications of a processor array in accordance with the invention. In both cases, the processor array comprises several computation cells, which are typically packaged as several computation cells within a single application specific integrated circuit (ASIC) device.

FIG. 1 illustrates a very simple application of the invention in a small adaptive beamforming system 50, as might be used in a RADAR, SONAR or communications system. Several sensors (a typical number of sensors is between 10 and 500) comprising a sensor array 52 are connected through a data switching or multiplexing circuit comprising multiplexers 54 and 56 to a processing array 60, and also to a FIFO memory element 62. Also connected to the array 60 is a source 70 of steering constraints (steering vectors) and an initialization device 80. At system initialization time, the initialization device 80 will download several parameters to the array 60, such as the DOF size of the problem, and the correction factor settings. At this point, the array 60 can begin computations, and performs all subsequent operations independently of the initialization device 80.

The adaptive weight computation process can be summarized as follows. First, the data switching circuit supplies several sample vectors to the processor array 60. The number of sample vectors is user-determined, based on the desired accuracy of the Cholesky factor, and can vary over a wide range; a typical number is 2 to 5 times the degrees of freedom (DOF) of the problem. These sample vectors are input to the processing array 60 in a word-serial, (bit-parallel) fashion at the full processing clock rate. The array uses this data to compute a Cholesky factor for these data samples on-the-fly.

Immediately after a sufficient number of sample vectors have been input, the multiplexer 56 comprising the data switching circuit applies a number of steering constraints to the array 60, again in a word-serial, bit parallel manner. The array uses these steering vectors to perform the first step of a five part backsolve process. The array then will automatically perform, the next four steps of the backsolve process and will, upon completion, output a final weight vector for each steering constraint that was input.

The weight vectors that the array 60 calculates are then applied to a beamformer circuit 82 comprising mixer 82A and summer 82B, where they are used to weight the previously stored data in the FIFO 62 (the same data that was used to calculate the weights), resulting in optimally formed beams.

Figure 2B:
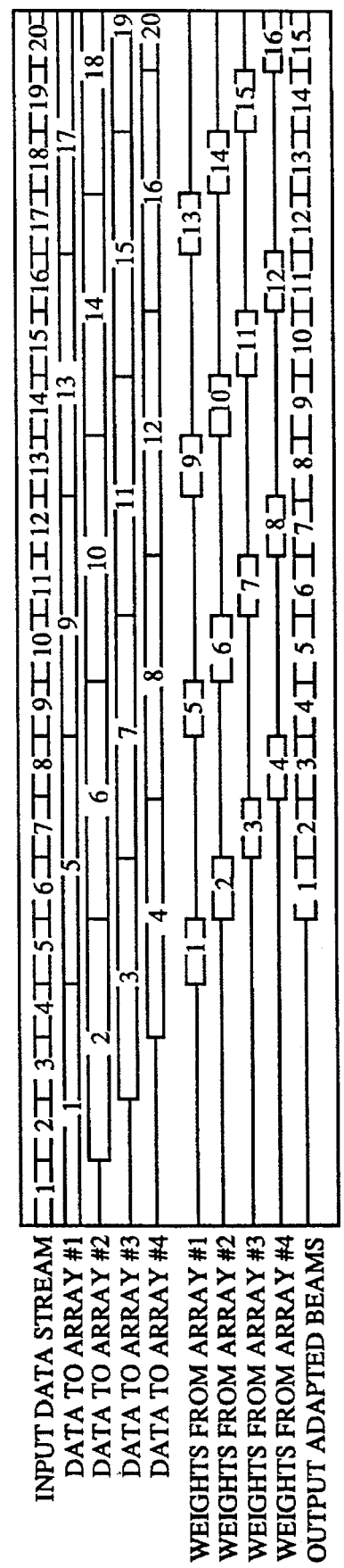
FIG. 2B is a signal flow timing diagram for the processor array of FIG. 2A.

FIG. 2 shows a more general application, where several arrays 60A . . . 60N in accordance with the invention are connected to a buffer memory subsystem 90, which supplies both sample vectors from the sensor array 52 and steering constraints from device 70 to the processor arrays. This is a higher performance configuration, used in situations where a single processor array does not provide sufficient processing power. The operation of the processor arrays is very similar to the previous case, except that the input sample vector data stream is now time-multiplexed into the inputs of the several arrays, and the computed weight vectors are re-assembled from the several arrays, again in a time-multiplexed manner, before they are applied to the beamformer function 82. FIG. 2B shows the time-multiplexed operation of the system 50'.

MATHEMATICAL BACKGROUND FOR THE PROCESSOR

This section outlines the mathematical basis for the method used by the processor to calculate an optimal adaptive weight vector from a sample data set. The following variables are used in the subsequent discussion:

| | |
|---|---|
| X | N × M data matrix containing raw data samples. |
| L | N × N Lower Triangular Cholesky matrix. |
| N | Number of degrees of freedom of the system (= number of rows in X). |
| M | Number of data samples (columns) in the data matrix X. |
| S | Number of CORDIC rotation stages. |
| B | Word length of the internal fixed point CORDIC cell. |
| K | Gain correction factor within the CORDIC cell. |

The processor architecture of the invention solves the linear system of equations described by $$R_{xx}\underline{w}=\underline{d}$$

for an adapted weight vector $\underline{w}$, where $R_{xx}$ is the system correlation matrix and $\underline{d}$ is the given steering constraint. This is analogous to the general linear system $$A\underline{x}=\underline{b}$$

where the matrix A is the information matrix describing the system, $\underline{b}$ is the given right hand side constraint vector, and $\underline{x}$ is to be determined. In order to provide a meaningful discussion of the architecture as it relates to general system applications and to provide some consistency in terminology, the discussion will hereinafter refer to the latter, general form.

In typical linear systems, A is not known but is estimated from a sample data set. If the data samples are uncorrelated and full rank N (as is usually the case due to noise and other factors in the system), then A can be estimated from a matrix of M raw data samples X as $$A = \frac{1}{M} XX^H$$

The matrix X is made up of N rows by M columns, where N is the number of degrees of freedom of the system and M is the number of data samples organized as column vectors $$X=[\underline{x}_1, \underline{x}_2, \ldots \underline{x}_M].$$

If the columns of X are linearly independent and full rank N, then the matrix $$XX^H$$

is symmetric positive definite and its inverse exists. Therefore $$\underline{x}=A^{-1}\underline{b}$$

where A is N×N, $\underline{b}$ is N×1, and $\underline{x}$ is N×1. The quantity A is called the covariance matrix of the system. When the covariance matrix is explicitly formed, the dynamic range of the data matrix X is doubled along with the required word length to represent the data on a computer. Therefore it is desirable to avoid working with covariance matrices if possible. Since A is symmetric positive definite, it can be factored into a lower triangular Cholesky matrix (factor) L as $$A=LL^H$$

The elements of L require only half of the dynamic range as the elements in A, and thus require about half the word length to represent the data. The Cholesky factor L is referred to as being in the voltage domain, where the matrix A is in the power domain. The system of linear equations can then be defined in terms of its Cholesky factor as $$LL^H\underline{x}=\underline{b}$$

The solution to this equation can than be obtained by first solving the lower triangular system $$L\underline{y}=\underline{b}$$

for the intermediate solution y and then solving the upper triangular system $$L^H\underline{x}=\underline{y}$$

for $\underline{x}$. Triangular systems such as these are easily solved by using back-substitution techniques. Therefore, if we have A and the constraint vector $\underline{b}$, then $\underline{x}$ can be obtained by Cholesky factorization rather than computing $A^{-1}$ explicitly. This is a numerically sound approach and has an efficient mapping onto the architecture of a processor embodying the invention.

The Cholesky factor L can be generated from sample data by applying a series of unitary transformations. These transformations perform the equivalent of a single post multiplication of the N×M data matrix X by a M×M unitary matrix Q. A unitary matrix Q is selected such that the non-zero elements of the resulting N×M matrix contain the lower triangular N×N Cholesky factor L.

These unitary matrices can be selected such that successive multiplications have the effect of zeroing out all of the elements above the diagonal and in the last M−N columns of the resulting N×M matrix. The N×N lower triangular submatrix is then the Cholesky factor L.

The processor architecture of the invention performs a rank one update of the Cholesky factor for every new sample data vector $\underline{x}_k$. A N×N+1 matrix is constructed by appending to the right edge of the existing Cholesky factor $L_k$ and post multiplying by a unitary matrix Q such that $\underline{x}_k$ is zeroed out. This results in an updated Cholesky factor $L_{k+1}$. The post multiplication of the unitary matrix Q is performed by using a series of circular Givens rotations.

The processor architecture zeros out the appended vector $\underline{x}_k$ one element at a time by applying successive Givens rotations. The first element $x_1$ of the vector is zeroed out by applying a theta rotation followed by a phi rotation. Successive theta and phi rotation sare applied to the remaining elements of x. The second element is then zeroed out by applying new theta and phi rotations. This process repeats until the entire vector $\underline{x}_k$ has been zeroed out.

VECTOR ROTATION METHODS

Theta Rotation—Used in Circular Rotation Pipeline

Figure 3:
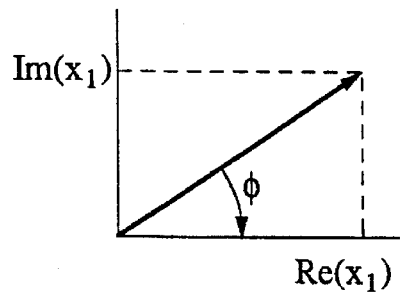
FIG. 3 illustrates a theta rotation employed in a circular rotation pipeline of an exemplary embodiment of the invention.

During the theta rotation operation, the input vector $\underline{x}_k$ is rotated such that the first element $x_1$ becomes real. The first element is referred to as the leader. The last column of the resulting matrix contains the vector $\underline{x}_k'$ consisting of a real element $\bar{x}'_1$ followed by complex elements $[x'_2 \ldots x'_N]$ that have been rotated by the angle $\Theta$. This is shown in FIG. 3.

Phi Rotation Operation—Used in Circular/Hyperbolic Rotation Pipeline

Figure 4:
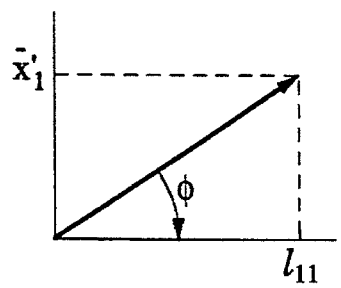
FIG. 4 illustrates a phi rotation operation employed in a circular/hyperbolic rotation pipeline of an exemplary embodiment of the invention.

During the phi rotation operation, the first element $\bar{x}'_1$ of the vector is rotated relative to the first element $l_{11}$ of the Cholesky factor L such that $\bar{x}'_1$ becomes zero (FIG. 4). Remember that $\bar{x}'_1$ has been previously rotated by $\Theta$ such that it is real. The rotation through the angle $\phi$ is accomplished by post multiplying the Cholesky factor and the appended vector by the Givens rotation $Q_\phi$. The $Q_\phi$ matrix zeros out the first element $\bar{x}'_1$ by rotating the real part of $\bar{x}'_1$ with the real part of $l_{11}$. The imaginary parts of $\bar{x}'_1$ and $l_{11}$ are zero since $\bar{x}_1$ is real and the diagonal elements of L are always real by definition. The real and imaginary parts of the remaining elements (followers) in x' are rotated relative to their respective parts in the first Cholesky column by the same angle $\phi$. This results in the modification of the first column of the Cholesky factor $[l'_{11} \ldots l'_{N1}]'$ and the vector $\underline{x}''$. The vector $\underline{x}''$ now contains a zero element followed by rotated complex elements and therefore has been reduced to N−1 elements in length.

The new N−1 length vector $\underline{x}''$ is now processed by theta and phi rotations in the same fashion to zero out the new leader element $x_2''$. The above process is repeated in an iterative fashion until the vector $\underline{x}_k$ has been completely zeroed as follows.

$$[L_k \vdots \underline{X}_k] Q \rightarrow [L_{k+1} \vdots \underline{0}]$$

The Cholesky factor is updated for M sample data vectors where M is chosen large enough to provide a good estimate of the Cholesky factor.

In addition to performing the Cholesky factor update operations described above, the processor array also has the capability to downdate the Cholesky factor. The downdating of a Cholesky factor is a well studied problem that can be implemented by various methods including hyperbolic Givens and Householder rotations. In real-time systems that solve successions of least squares problems, where the statistics of the successive data sets are changing slowly with time, each new solution can be obtained by making use of a large fraction of old data. This is analogous to sliding rectangular window functions, where contributions of old data are discarded as new data is processed. The operation of removing contributions of old data is referred to as downdating. The processor efficiently implements Cholesky downdating by reconfiguring the circular/hyperbolic rotation pipeline to perform hyperbolic vector rotations.

Having computed L, the triangular system can then be solved for $\underline{y}$ (as in $L\underline{y}=\underline{b}$) and then for $\underline{x}$ (as in $L^H \underline{x}=\underline{y}$) by back substitution techniques. The processor array can efficiently solve these triangular systems of equations like these by using similar unitary transformation techniques.

The vector $\underline{y}$ depends only on the values contained in the last column of the unitary matrix Q. Therefore, if $\underline{b}$ can be zeroed out with a unitary matrix Q, then $\underline{y}$ can be obtained from the values in the last column of Q. This is fundamental to the backsolve operations performed by the HAWC architecture. The intermediate vector y can now be used to solve the triangular system using this same procedure of zeroing out an appended vector to the Cholesky factor.

An N×N+1 matrix is first constructed by appending $\underline{b}$ in onto the right edge of the Cholesky matrix L as follows.

$$[L \vdots \underline{b}]_{N \times (N+1)}$$

This matrix is then multiplied by a (N+1)+(N+1) unitary matrix Q so that the last column of the resulting matrix is zeroed out.

$$[L \vdots \underline{b}] Q \rightarrow [L' \vdots \underline{0}]$$

Note that the Cholesky factor is not updated in this operation. The unitary matrix Q can then be partitioned, where $\underline{q}_1$ and $\underline{q}'_2$ are N×1 complex vectors and q is a complex scalar. Then we find that $$[L \vdots \underline{b}] \begin{bmatrix} \bar{Q} & \vdots & \underline{q}_1 \\ \cdots & \vdots & \cdots \\ \underline{q}'_2 & \vdots & q \end{bmatrix} = [L' \vdots \underline{0}]$$

The following two equations are then derived $$L\bar{Q}+\underline{b}\underline{q}'_2=L'$$

and $$L\underline{q}_1+\underline{b}q=\underline{0}$$

Solving for $\underline{b}$ $$L(\underline{q}_1/q)=\underline{b}$$

which is of the form $L\underline{y}=\underline{b}$ where $$\underline{y}=(\underline{q}_1)/(q)$$

This is the desired solution. From this result it is observed that the vector $\underline{y}$ depends only on the values contained in the last column of the unitary matrix Q. Therefore, if $\underline{b}$ can be zeroed out with a unitary matrix Q, then $\underline{y}$ can be obtained from the values in the last column of Q. This is fundamental to the backsolve operations performed by the processor architecture.

The matrix Q is made up of all the individual CORDIC rotation controls throughout the systolic array. The array can extract the last column of Q from the systolic array in its final form, thus eliminating the need for external processing. The problem now is how to extract the values that make up the last column of Q. It is known that $$[L \vdots \underline{b}] Q \rightarrow [L \vdots \tilde{\underline{b}}_r]$$

where Q is an arbitrary unitary matrix. In this case, the appended vector $\underline{b}$ is not zeroed out, but is modified as vector $\tilde{\underline{b}}$. If Q is partitioned again, then $$L\underline{q}_1+\underline{b}q=\tilde{\underline{b}}_r$$

If the controls in the systolic array that make up Q are fixed, then the identity matrix I can be substituted for the Cholesky matrix L, and a N element vector of zeros substituted for $\underline{b}$ to get $$I\underline{q}_1+\underline{0}q=\tilde{\underline{b}}$$

yielding $$\underline{q}_1=\tilde{\underline{b}}$$

The N element vector is the solution $\underline{y}$ scaled by a complex constant q. Therefore, by fixing Q and switching the Cholesky matrix for the identity matrix, the first N elements in the last column of Q (which is $\underline{q}_1$) can be extracted by passing a vector of zeros through the array as a sample data vector.

IMPLEMENTATION—COMPUTATION CELL AND ARRAY—BASIC CONCEPTS.

As shown in FIG. 1, the processor array 60 comprises one or more computation cells 62 connected in a linear array. The computation cell 62 is a key element of the invention, and includes three very high performance vector rotation engines, temporary data storage, a dataflow control function and a programmable, data packet driven control sequencing function. The exemplary systolic array of computation cells described herein is designed specifically to compute an optimal recursive least squares (RLS) solution to a linear system based on a set of sample data, but can be applied to many other algorithms.

Figure 5:
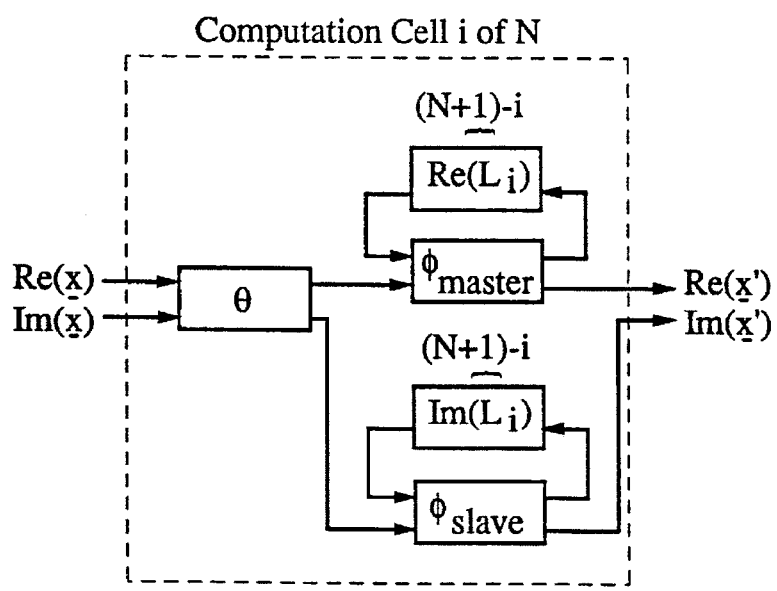
FIG. 5 is a simplified block diagram of a computation cell comprising a linear array in accordance with the invention.

Each computation cell in the linear array contains three CORDIC rotation cells and memory used to store one or more columns of the Cholesky factor. The computation cell is constructed conceptually as shown in FIG. 5, where $L_i$ is the ith column of the Cholesky factor. The theta and phi cells perform vector rotation operations using the well-known CORDIC method. See, e.g., C. M. Rader et al., id.; J. E. Volder, "The CORDIC trigonometric computing technique," IRE Trans. Electron. Comput., Vol. EC-8, No. 3, 1959, pp. 330–334.

Computation Cell Structure

The number of Cholesky matrix elements stored within each computation cell 62 is dependent on its location in the systolic array. The ith computation cell in an array of N computation cells contains N+1−i complex Cholesky elements. In other words, the first computation cell contains N elements, the second computation cell contains N−1, the third computation cell contains N−2, and so on down to the last computation cell which contains one element. This results in a triangular memory structure that represents the Cholesky matrix.

Figure 6:
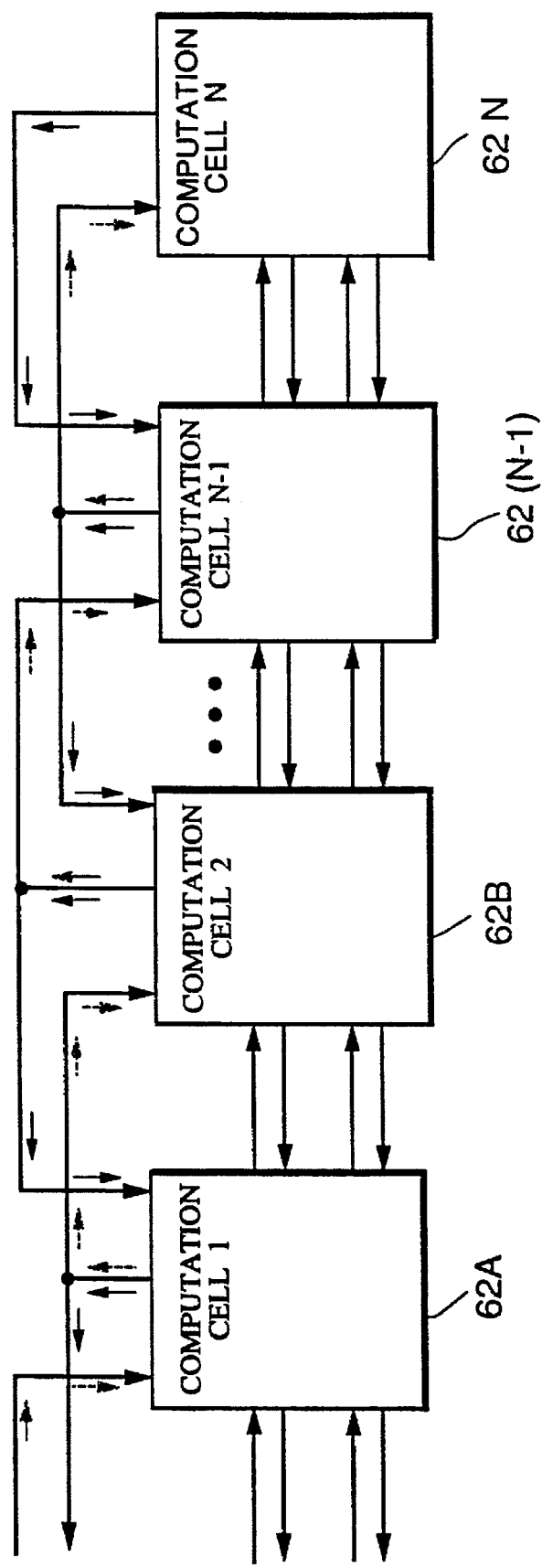
FIG. 6 is a block diagram of a linear array of computation cells in an exemplary embodiment.

The computation cells 62 are interconnected into a linear array as shown in FIG. 6. The exemplary array 60 of FIG. 6 includes four cells 62A, 62B, 62C and 62D. The data connections between computation cells 62 are local, alleviating the need for a global bus. Packets containing data sample vectors of length N are passed through the systolic array 60 starting with the first computation cell 62A. The first computation cell zeros out the leading element of the vector and passes the remaining N−1 element vector to the second computation cell 62B. The second computation cell zeros out the leading element again and passes the N−2 element vector to the third computation cell 62C. This processes repeats until the Nth computation cell zeros out the remaining 1 element vector. By the time the data sample vector is passed through the entire array, it is completely zeroed out.

This scenario suggests that the resources in each computation cell are not utilized efficiently. In fact, only the first computation cell is working 100% of the time. In order to utilize the hardware efficiently, the array of computation cells can be folded back on itself, where data is interleaved between computation cells 62. The data is passed from the first cell 62A to each succeeding cell 62B, 62C and to the last cell 62D in the array, and is then sent back through the cells 62C, 62B to the first cell 62A. This operation is illustrated by the data flow arrows in FIG. 6, and has the effect of forming a rectangular memory structure from the triangular structure. This provides a method to maximize efficiency and reduce latency. The folding scheme used is highly dependent on the number of computation cells in the array and a given hardware implementation. Since there are many different possible folding schemes that may be realized in hardware, only the general linear case will be examined.

The Givens transformation can be realized by various algorithms. Most involve the use of multipliers, dividers, and square root functions. These tend to be costly in terms of silicon area in VLSI designs. There are algorithms that makes use of only adders, subtractors, and shifters to perform many trigonometric operations. One such algorithm is the Coordinate Rotation Digital Computer (CORDIC) algorithm, first introduced in 1959 by J. E. Volder, id. CORDIC is a rotation-based algorithm that efficiently calculates many elementary functions such as sine, cosine, and tangent using only shift and add operations in an iterative manner. The fundamental operation performed in the CORDIC algorithm is the rotation of a 2×1 vector in linear, circular, and hyperbolic coordinate systems. The iterative nature of the algorithm lends itself to pipelined architectures that can be efficiently implemented in VLSI technology.

IMPLEMENTATION—COMPUTATION CELL AND ARRAY—PACKET CONCEPT

The processor array 60 includes a number of computation cells 62A–N. During array operation, all information is passed between computation cells in a packet form. A number of different types of packets are defined, each conveying different information to the receiving computation cell. Upon the receipt of a packet, a computation cell can extract information from a packet header that defines the type of packet, what step of the processing the packet is associated with, what operation the receiving computation cell is supposed to perform after receiving the packet, as well as a number of other parameters that affect the processing functionality which are defined separately for each packet type.

Packet Structure

Figure 7:
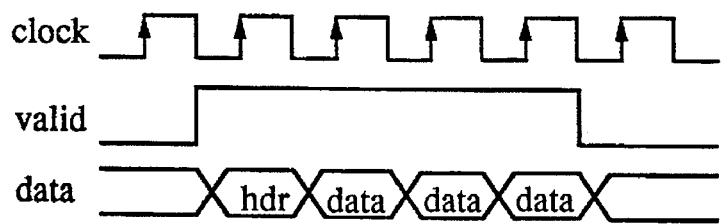
FIG. 7 illustrates the packet data structure employed in an exemplary linear array embodiment.

All packets consist of a 64 bit header followed by at least one 64 bit data word. The header is identified as the first word clocked in after the valid signal goes high. FIG. 7 illustrates the data packet structure.

Packet Header

In an exemplary embodiment, the packet header is a 64 bit word made up of several bit fields. These fields contain a minimum of information including packet type, word count, source and destination addresses, and packet routing. There are additional fields that are used on a packet specific basis. The header bit fields are described below.

Header Fields

Packet Type describes the type of packet. Exemplary packet types are listed hereinbelow.

Word Count indicates the number of data words following (not including) the header.

Source Address contains the address of the computation cell that sent this packet.

Destination Address contains the address of the computation cell to receive this packet.

Routing Bits indicate whether this packet is to be sent to the left (toward beginning of the array), to the right (toward the end of the array), or both directions.

Misc. Field use varies on a packet specific basis. This field is generally used to indicate data sample number, steering constraint number, or weight vector number.

Packet Data is interpreted differently, depending on the type of packet being processed. For the majority of packets, each data word is interpreted as a complex number made up of two IEEE single precision floating point numbers. The most significant 32 bits contains the real portion of the data and the least significant 32 bits contain the imaginary portion of the data.

For rotation control packets, the data word contains 2S bits that make up the rotation angles in the CORDIC cells. The most significant bit corresponds to the first stage in the CORDIC pipeline. The remaining 64-2S bits are not used.

Configuration packets interpret the data word following the header as three bit fields. The most significant bit field contains the circular rotation correction factor for the Theta CORDIC cell. The next two fields contain the circular and hyperbolic correction factors for the Phi CORDIC cell.

Packet Types

The array supports several different types of packets. Ten of the most fundamental types are described here. There is however nothing inherent in the architecture preventing the addition of new packet types and functions.

Configuration Packet

The configuration packet is generated by the host system and consists of a header followed by a single data word. It is used to initialize the array prior to any data processing. The source address field in the header contains the new left address. The destination address field contains the degrees of freedom (N). The misc. field contains the latency value needed for proper packet interleaving. The data word contains the correction factors for the Theta and Phi CORDIC rotation cells.

Upon receiving a configuration packet, the computation cell decodes the header fields and uses this information to calculates its physical addresses (both right and left), the number of degrees of freedom, latency, and whether or not it is the last computation cell in the array. This data is stored locally within each computation cell until another configuration packet is received. The source address in the packet header is then incremented and stored in the header FIFO. The data word following the header is sent through the rotation engine pipeline with the appropriate control information. Each CORDIC cell then extracts its correction factor(s) from bit fields in the data word and passes the data word on unmodified. If the computation cell is not to be the last one in the array, the modified header in the FIFO and the unmodified data word are then sent as a packet to the next computation cell for processing.

Cholesky Update Packet

The Cholesky update packet is generated by the host system and consists of a header followed by N data words, where N is the degrees of freedom. The data is organized as a N element vector of complex numbers, each representing a single raw data sample.

Upon receiving a Cholesky update packet, the computation cell sends the data through the rotation engine pipeline with the appropriate control information. This instructs the CORDIC cells to zero out the leading data element and update the Cholesky storage RAMS. The word count field in the packet header is decremented and the source address updated. The resulting header is then stored in the header FIFO. When the modified data exits the rotation engine pipeline, it passes through the latency adjust RAM where it is delayed by the appropriate amount. As the data emerges from the latency RAM, it is packetized with the new header from the FIFO and sent to the next computation cell. The packet is now one sample shorter in length due to the zeroed out data.

Cholesky update packets propagate through the array from the first computation cell to the last where they are turned around and sent back. As they propagate through the array, they become smaller and are finally consumed when they return to the first computation cell.

Cholesky Downdate Packet

The Cholesky downdate packet is similar to the update packet except that different control information is passed through the rotation engine pipeline with the data. This control information instructs the Phi CORDIC cells to perform hyperbolic rotations of the data. These hyperbolic rotations cause the Cholesky factor to be downdated.

Steering Constraint Packet

The steering constraint packet consists of a header followed by N data words, where N is the degrees of freedom. The data is organized as a vector of N complex numbers representing a single steering constraint.

These packets are processed similar to Cholesky update packets. Each computation cell zeroes out the first data element in the packet however the Cholesky factor is not updated. For each steering constraint packet, the computation cell stores the rotation controls (q's) generated by zeroing out the leading data element. The rotation controls are stored in the computation cell's Q storage RAM. If multiple steering constraints are received, multiple rotation controls are stored to be later used in the backsolve operation to solve for multiple weight vectors.

Backsolve Start Packet

The backsolve start packet consists of a header followed by a single data word. The data word is only used for test purposes.

This packet is generated by the host system when all data and steering constraint packets have been processed. It instructs the computation cell to begin the backsolve process. The backsolve start packet is propagated through the array where it is consumed by the last computation cell.

Weight Vector Packet

The weight vector packet is generated internally by each computation cell upon completion of the backsolve process. Each packet is sent to the beginning of the array where it is output to the host system.

The packet consists of a header followed by the number of data words equal to the number of steering constraints input into the array. Therefore N weight vector packets will be generated where each contains all of the weights to be applied to a given receiver channel. The source address field in the header indicates the weight vector element number.

Cholesky Full Load Packet

The Cholesky full load packet is generated by the host system when it is desired to preload the entire Cholesky matrix to a known set of values prior to processing data.

The packet consists of a header followed by (N+1) data words. Each packet is addressed to a specific computation cell. When the addressed computation cell receives a Cholesky full load packet, the entire Cholesky factor is overwritten with the data in the packet. Since each computation cell contains two columns of the Cholesky matrix, this is equivalent to loading two columns at a time. The addressed computation cell consumes this packet.

Cholesky Diagonal Load Packet

The Cholesky diagonal load packet is generated by the host system when it is desired to preload the diagonal of the Cholesky matrix to a known set of values prior to processing data. All off-diagonal elements of the Cholesky matrix are set to zero.

The packet consists of a header followed by N data words. The first data word is the complex value to be loaded into the upper left diagonal element of the Cholesky matrix. Successive diagonal elements are loaded with the remaining data words in order. Each computation cell that receives the Cholesky diagonal load packet strips off the first data word and sets the appropriate element in its Cholesky storage RAM to that value. The resulting packet is one less in length and is propagated to the next computation cell in the array. When the packet encounters the last computation cell, it is reflected back to the start of the array where it is consumed.

Cholesky Read Packet

The Cholesky read packet is generated by the host system when it is desired to read the contents of the Cholesky matrix from the array. The packet consists of a header followed by (N+1) data words. Each packet is addressed to a specific computation cell. When the addressed computation cell receives a Cholesky read packet, the entire contents of the local Cholesky storage RAM is output after the header. Since each computation cell contains two columns of the Cholesky matrix, this is equivalent to reading two columns at a time. Only the addressed computation cell responds to this packet. All others propagate the packet unmodified.

Rotation Controls Packet

The rotation controls packet is used internally by the array to pass vector rotation angle information between computation cells. The packet consists of a header followed by a variable number of data words. Each data word contains the entire set of controls needed by the Theta and Phi CORDIC cells to rotate a vector through a specified angle. Each bit in the data word corresponds to a pipeline CORDIC stage. The most significant bit in the data word corresponds to the first stage in the CORDIC pipeline. Since there are fewer total pipeline stages than bits in the data word, the least significant 64-2S bits are unused.

Program Download Packet

The program download packet is used to program the RAM portion of the microcode sequencer by the host system. The packet consists of a header followed by a variable number of data words. Each data word contains a micro program instruction and RAM address. This allows the entire RAM to be programmed as well as only selected memory locations.

IMPLEMENTATION—COMPUTATION CELL ARRAY—PROGRAMMABILITY

Figure 8:
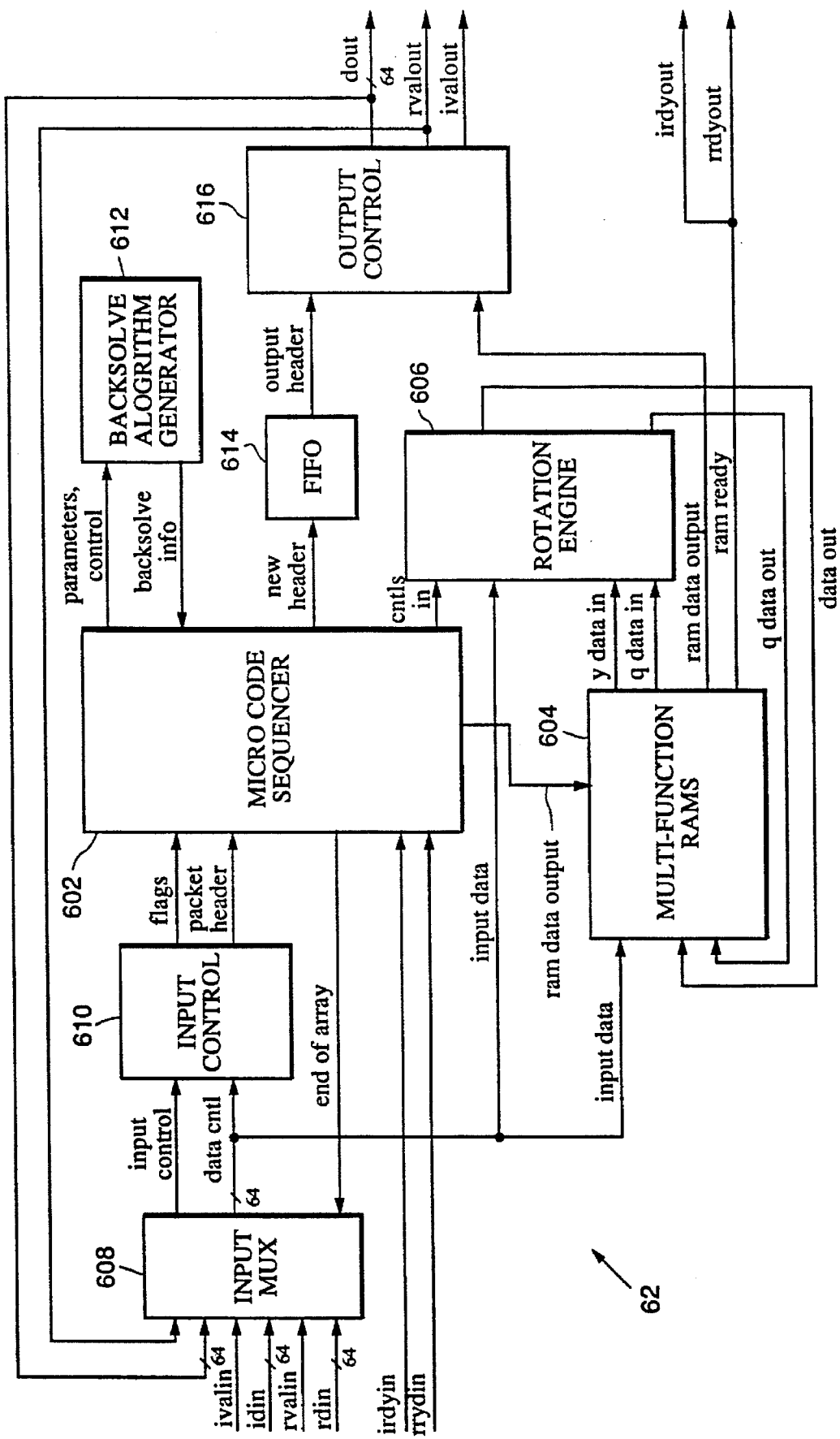
FIG. 8 is a schematic block diagram of an exemplary embodiment of a computation cell comprising the array of FIG. 8.
Figure 9:
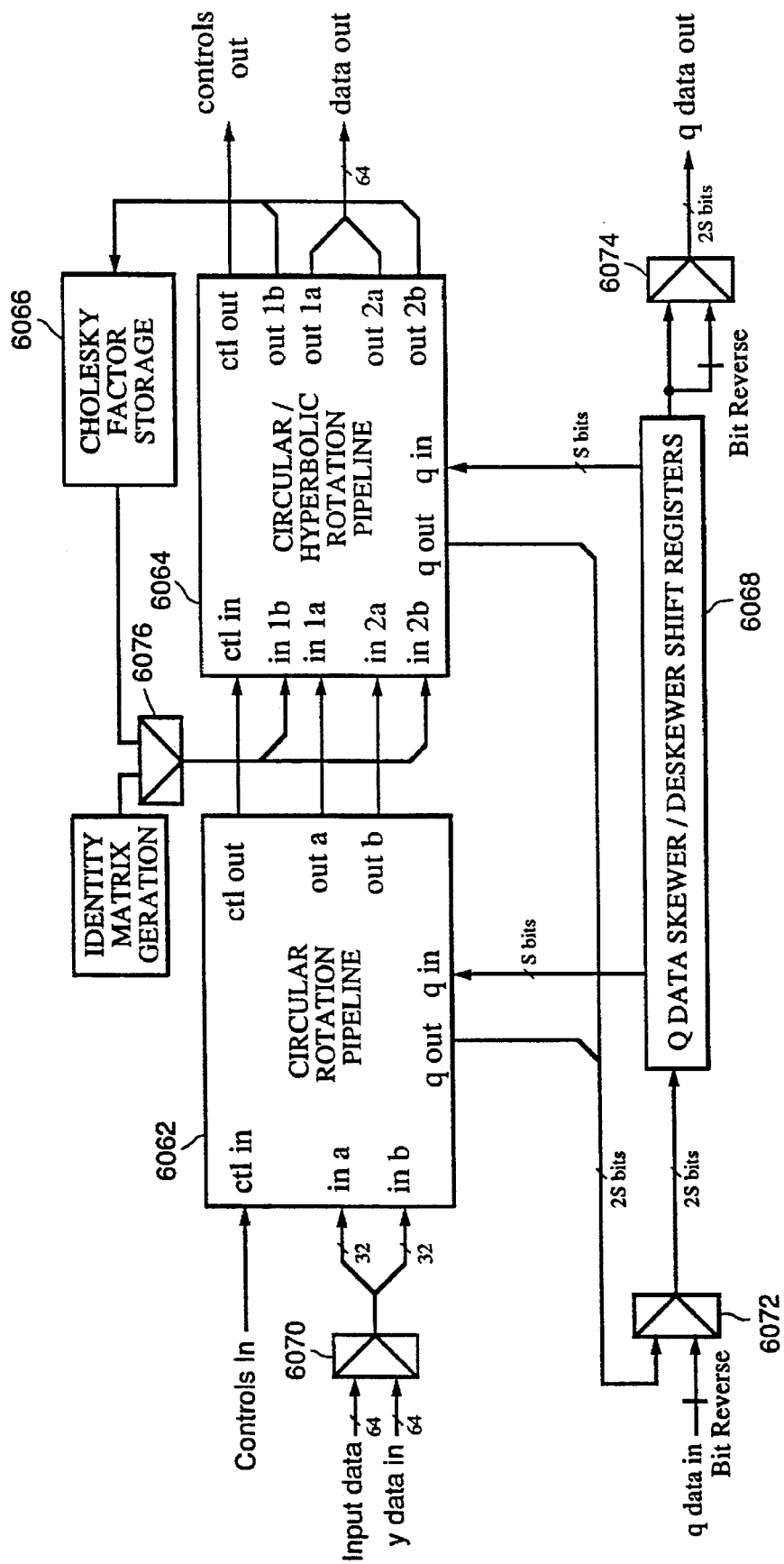
FIG. 9 is a schematic block diagram of a rotation engine comprising the cell of FIG. 8.

The computation cell array 62 is programmable to allow for variations of algorithms to be implemented. FIG. 8 is a block diagram of an exemplary implementation of one computational cell 60. A programmable microcode sequencer 602 is part of the computation cell, and is the main programmable element. The sequencer 602 executes microcode that causes various algorithm steps to be performed. Operations can be performed based on the arrival of packets from another supercell. As part of its operation, the sequencer 601 generates controls for all of the programmable address generators for each of the data memories located within the multi-function RAM (MFRAM) function 604. The sequencer 602 also generates the pipelined programmable function control bits which are passed to the rotation engine 606, where they control all aspects of the two rotation pipelines, Cholesky storage, Q data skewer/deskewer and the data path multiplexers comprising the rotation engine 606, as shown in FIG. 9. Every major function in the computation cell is controlled by control information generated by the programmable sequencer 602.

The computation cell 62 further includes an input multiplexer 608, an input control function 610, a backsolve algorithm generator 612, a FIFO buffer 614, and an output control function 616. These elements are all described in further detail hereinbelow.

IMPLEMENTATION—COMPUTATION CELL ARRAY—CHOLESKY UPDATE METHOD

The array 60 performs successive rank-1 recursive updates of a Cholesky factor. Each update is performed using multiple Givens rotations. Note that each iterative update of the Cholesky factor is in fact a QR factorization process—i.e., unitary transformation. The QR process could be performed using either Householder, Givens, or Gram-Schmidt algorithms. See, e.g., G. H. Golub et al., "Matrix Computations," The Johns Hopkins University Press, 2nd Ed. 1989, pp. 211–219. The processor array uses the Givens algorithm because it is best suited to a linear systolic hardware implementation of the rank-1 update process. The Householder algorithm is considered to have the best numerical properties of the QR algorithms; however, the Givens algorithm has been found to have nearly identical properties as demonstrated by J. M. Wilkinson, "The Algebraic Eigenvalue Problem," Oxford University Press, 1965, pp. 131–139, 152–162.

The weight computation process includes two steps. First, a triangular representation of an estimate of the sample covariance matrix (the Cholesky factor) is computed, and then the optimal solution to the system of equations is computed from the Cholesky factor via a backsolve process. During this backsolve operation, a set of steering constraints are applied to the processing array and are used in the generation of the adaptive weights. In the example of a typical adaptive beamforming RADAR system, the sample data consists of samples from multiple receiver channels, the steering vector is the desired 'look direction' and the computed solution is an adaptive weight vector which is then used for beamforming.

The vector rotation engines 606 within the computation cells are used to perform a data sample zeroing process through the application of a series of Givens' rotations on the data. The rotation engines implement the Givens' rotations using the CORDIC algorithm, which performs vector rotations using a series of rotations stages constructed of adders and shifters. This architecture is well suited to a pipelined VLSI implementations. The temporary data storage provided by the RAMS 604 can be used to store a portion of a lower triangular representation of the estimated sample covariance matrix (referred to as the Cholesky factor), or it can be used to store other data in matrix form. The programmable data flow function is used to ensure the uniform and properly sequenced flow of data that is crucial to efficient systolic processing array. This data flow function includes delay adjustment functions, and temporary data storage functions. The downloadable, programmable control function both sequences the movement of data packets between the computation cells 62, and controls all of the internal operations of each computation cell 62.

An example of how the processor array 60 works is the computation of an optimum solution to a linear system defined by a sample data set. Data samples are passed through the systolic array 60 and are zeroed out by performing a series of vector rotations. During this process, the Cholesky factor storage is updated with the information in the data sample. As more samples are processed, the estimate of the sample covariance matrix (Cholesky factor) becomes increasingly accurate. When a sufficient number of samples have been processed, the adaptive weights are computed from the Cholesky factor by a two step backsolve process using the same systolic array.

IMPLEMENTATION—COMPUTATION CELL ARRAY—BACKSOLVE METHOD

The back solve operation is accomplished by passing a steering vector through the array 60 as a data sample without updating the Cholesky factor, setting all of the rotation angles required to zero out the steering vector. The rotation angles are then fixed, the Cholesky factor is replaced by the identity matrix, and a zero vector is then passed through the array. The output from the array is stored as an intermediate result used in the final back solve step. The rotation angle information is then passed backwards through the array while zeroing out the intermediate result, producing another set of rotation angles. These angles are fixed and the identity matrix and a zero vector are used as in the previous step to output the final weight vector from the systolic array. The backsolve implementation is described in more detail in the following steps:

Step #1—Zero out Steering Vectors

The first step in the backsolve operation is to generate a unique unitary transformation that will zero out each steering vector. The unitary transformation is realized by successive application of each computation cell's rotation controls to the data. Each set of rotation controls is referred to as a set of q's. The q's are generated by passing the steering vector packets through the array 60 in the same manner as Cholesky update data where they become zeroed out one element at a time.

There are two distinct differences between steering vector packet processing and Cholesky update packet processing. First, the Cholesky factor is not updated as the steering vectors are zeroed out. Second, for every steering vector processed, each computation cell 62 must save the set of rotation controls (q's) in local RAM for later processing. Since the array 60 can process multiple steering vectors, it is necessary to generate and save multiple q's in each computation cell's local Q RAM.

Step #2—Generate the Intermediate result Y

The next step is to generate the intermediate Y vectors from the q's stored in each computation cell 62. This can be accomplished by applying a unitary transformation to the identity matrix and an appended zero vector as discussed previously. By close examination of the operations being performed on the zero vector as it propagates through the array, it can be shown that the elements undergo successive rotations of different q's. The equations below describe this step of the backsolve process for an eight degree of freedom problem, which the exemplary array 60 can resolve.
1) $y7=q7(0,1)$
2) $y6=q7(q6(0,1),0)$
3) $y5=q7(q6(q5(0,1),0),0)$ . .
8) $y0=q7(q6(q5(q4(q3(q2(q1(q0\ (0,1),0),0),0),0),0),0),0)$ Equation 1) states that y7 is produced by rotating the number zero by q7 and substituting a one for the Cholesky factor (i.e., the identity matrix diagonal). Equation 2) states that y6 is produced by rotating a zero by q6 with the Cholesky factor set to one and the result rotated by q7 with the Cholesky factor set to zero (i.e., the identity matrix off-diagonal). Equation 8) states that y8 is produced by rotating a zero by q0 with the Cholesky factor set to one followed by rotations of all other q's with the Cholesky factors set to zero. From this it can be seen that by passing q's between computation cells in the appropriate order, the intermediate Y values can be generated locally on each computation cell.

The processor array performs this operation by passing the q's between computation cells as rotation control packets. The partial Y solutions are temporarily stored in local Y RAMS. The final Y values are stored in complex conjugate form, the form needed in the next step of the backsolve process.

Step #3—Zero out the intermediate solution Y

In this step of the backsolve operation, a unique unitary transformation must be generated that will zero out each set of intermediate Y vectors. This could be accomplished by extracting the Y's stored in the computation cells and passing them through the array as a steering vector packet. However, this operation can also be performed by only passing q's between computation cells. This eliminates the need to extract the Y vector from the array. The equations below describe this step of the backsolve process for an eight degree of freedom problem.
1) $q7=ZERO(y7)$
2) $q6=ZERO(q7(y6))$ . .
8) $q0=ZERO(q1(q2(q3(q4(q5(q6(q7(y0))))))))$ Equation 1 states that q7 is generated by zeroing out y7. Since q7 and y7 reside in the same computation cell, this operation may be performed immediately. Equation 2 states that y6 is first rotated by q7 (generated by the adjacent computation cell). Since y6 resides in a different computation cell than q7, q7 must be passed to it via a rotation control packet before this operation can be performed. After y6 is rotated by q7, the result is then zeroed out producing q6. Equation 3 states that q5 is generated by first rotation y5 by y7 and q6, respectively. The result is then zeroed out producing q5. The same procedure is followed for the remaining equation. From this it can be seen that by passing q's between computation cells in the appropriate order, the q's can be generated locally on each computation cell. The previous q's in Ram are overwritten with these new q's during this step.

Step #4—Generate the final solution

The adapted weights (W's) are generated similarly to the Y's in step #2. The equations below describe this step of the backsolve process for an eight degree of freedom problem.
$w0=q0\ (0,1)$
$w1=q0\ (q1(0,1),0)$
$w2=q0(q1(q2(0,1),0),0)$ . .
$w7=q0(q1(q2(q3(q4(q5(q6(q7(0,1),0),0),0),0),0),0),0)$

IMPLEMENTATION—COMPUTATION CELL DESCRIPTION

The computation cell 62 is the fundamental processing element in the linear systolic array 60. Computation cells are connected to each other in a nearest neighbor fashion so that only local interconnect is required (FIG. 6). The input/output (I/O) controls and signals are described as follows.

lvalin—Left valid input. This signal is active when there is valid data on the ldin input bus.

ldin—Left data input. This is a 64 bit bus that is connected to the output of the previous (left) computation cell in the array.

rvalin—Right valid input. This signal is active when there is valid data on the rdin input bus.

rdin—Right data input. This is a 64 bit bus that is connected to the output of the next (right) computation cell in the array.

lrdyin—Left ready input. This signal is connected to the rrdyout signal of the previous (left) computation cell in the array. This signal indicates that the computation cell to the left is ready to accept data into its external buffer RAM.

rrdyin—Right ready input. This signal is connected to the lrdyout signal of the next (right) computation cell in the array. This signal indicates that the computation cell to the right is ready to accept data into its external buffer RAM.

dout—Data output. This is the 64 bit output bus for the computation cell.

rvalout—Right valid output. Indicates valid data on dout to be sent to the next (right) computation cell in the array.

lvalout—Left valid output. Indicates valid data on dout to be sent to the previous (left) computation cell in the array.

lrdyout, rrdyout—Left and right ready outputs. Indicate that the external buffer RAM is ready to accept data.

Functional Block Descriptions

The computation cell 62 includes many functional blocks that together describe the functionality of the computation cell. They are described as follows.

Input Mux 608

This block 608 is responsible for selecting one of three data and control input pairs to the Input Control block 610. The lvalin and rvalin signals are used to arbitrate between the external data inputs ldin and rdin respectively. An error condition exists if more than one valid signal should ever become active together during the same clock. If the end-of-array signal is set, then the dout and rvalout signals are selected in place of the rdin and rvalin inputs. The input control signals indicate valid data on the input data line and the source of the data.

Input Control 610

The input control block 610 contains a state machine that monitors the input control for a new packet. When a new packet is detected, the packet header is stripped off of the input data bus and sent to the microcode sequencer 602. As the packet is being received, the input control block 610 generates sets of control flags that describe the packet start, end, direction that the packet is traveling through the array, and whether the packet is a special type of external control packet.

Microcode Sequencer 602

The microcode sequencer 602 performs all of the control and synchronization functions within the computation cell 62 via microcode programs stored in ROM. The sequencer contains an instruction decode unit, program RAM and ROM, program counter, index registers, stack, and a minimal ALU. The sequencer executes all instructions in a single clock to allow tight synchronization with the hardware functions. When no packets are being processed, the sequencer remains in an idle state. Upon receipt of a new packet, the sequencer fetches the start address of the microcode from a lookup table. The sequencer then begins execution at that address until an end of segment instruction is encountered. When this occurs, the sequencer returns to the idle state until the next packet is encountered.

The microcode sequencer instruction set includes program flow control and specialized data control functions. Program control flow instructions include standard functions as jump, branch, conditional branch, loop, jump to subroutine, return from subroutine, and conditional wait. The specialized data control instructions perform operations such as controlling/monitoring the rotation engine pipeline, the FIFO 614, the multi-function RAMS 604, and the backsolve algorithm generator 612.

The sequencer 602 continuously monitors the state of the flags looking for a start of packet condition. When this condition is detected, the packet type field of the packet header is decoded and the microcode start address is fetched from a vector lookup table. The sequencer then begins execution at the specified start address.

The first instructions in a typical microcode program segment set the controls in latch that feeds the rotation engine control pipeline. The control pipeline is a series of bits that are pipelined along with the data. They tell the rotation engine 606 what type of data is in the pipeline and how to process it during various stages.

Once the pipeline is configured for the packet data, the program typically generates a new header and writes it to the FIFO 614 where it will be sent to another computation cell at the appropriate time. Additional program tasks would include configuring storage RAMS 604 for read/write operations, forming output packets, and controlling the backsolve algorithm generator 612, and monitoring the condition of neighboring computation cells.

A portion of the microcode program address space is mapped onto RAM and can be programmed via special data packets from the host system, e.g., the radar system. This allows the computation cell's existing functionality and algorithms to be modified and new functionality to be added.

FIFO 614

The FIFO 614 is used to store headers to be sent to the output control block 616 when packets are generated. The microcode sequencer 602 generates headers and writes them to the FIFO. The headers are then read from the FIFO by either the microcode sequencer or by special control bits that are pipelined along with the data.

Multi-Function RAMS 604

This block 604 contains special purpose dual port RAMS: 1) Q storage RAM, 2) Y storage RAM, 3) External Buffer RAM, and 4) latency adjustment RAM. Each of the RAMS have separate read/write state machines and address generators. The microcode sequencer 602 initializes any given RAM via the ram control bus by loading a read/write start address and a word count. When a start signal is received from the microcode sequencer or the rotation engine 606, the RAMS begin their respective read/write operations for their specified word count. Under control of the sequencer 602, the External Buffer RAM and Q RAM outputs can be multiplexed onto the q data in bus that feeds the rotation engine 606. The output of the Y RAM drives the y data in bus that feeds the rotation engine.

The Q storage RAM is used to store the sets of CORDIC rotation controls needed during the backsolve process. The Y storage RAM is used to store intermediate data results during the backsolve process. The External Buffer RAM is used to store external rotation control packets that are sent from adjacent computation cells. The input control block 608 detects these special types of packets and sends them directly to the External Buffer RAM where they are processed later. This allows a computation cell to receive a rotation control packet without interrupting program execution. The latency adjustment RAM is only used during Cholesky update/downdate and Steering vector packet processing. It provides the necessary latency for proper packet interleaving in the systolic array 60.

Rotation Engine 606

The rotation engine 606 performs the vector rotation operations. The rotation engine is described in more detail hereinbelow.

Output Control 616

The output control block 616 is responsible for generating packets and their valid control signals. The output control block receives control from the microcode sequencer 602 or the rotation engine control pipeline. When instructed to generate a packet, the output header is read from the FIFO 614 and output on the dour port with the appropriate rvalout or lvalout signals. A counter internal to the output control block 616 is loaded with the word count field in the header. The ram data output is then multiplexed to the dout port for the required word count. An internal state machine comprising the output control 616 resets the rvalout and lvalout signals when the word counter has expired.

Backsolve Algorithm Generator 612

The backsolve algorithm generator block 612 is responsible for generating the required information for the microcode sequencer 602 to execute the entire backsolve process. The sequencer 602 interfaces with the backsolve algorithm generator via a set of parameter and control signals. The parameters include the computation cell address, degrees of freedom, end-of-array bit, and algorithm number. These are read directly from registers internal to the sequencer 602.

The backsolve process is broken down into four algorithms. The sequencer 602 begins communication with the backsolve algorithm generator 612 by supplying it with the algorithm number and a start signal. The backsolve algorithm generator 612 responds by supplying information that describes the operations to perform. The fundamental backsolve operations include:

1) Read from Y RAM, Q RAM or External Buffer RAM
2) Write to Y RAM, QRAM
3) Send rotation control packet to the left
4) Send rotation control packet to the right
5) Wait for rotation packet from adjacent computation cell
6) Use the identity matrix in place of the Cholesky factor
7) Conjugate the data before writing to Y RAM.

When the sequencer 602 completes the operation, it requests the next operation from the backsolve algorithm generator 612 and performs that operation. Additional operations are requested until the backsolve algorithm generator signals the completion of the algorithm. The sequencer will then proceed to the next algorithm number and repeat the entire process until all algorithms have been performed.

IMPLEMENTATION—ROTATION ENGINE DESCRIPTION

An exemplary implementation of the rotation engine 606 is shown in FIG. 9. The rotation engine 606 supports the Cholesky Factor computation and the backsolve computation through a process of zeroing out the data vectors that are applied to it in the course of these computations. The rotation engine 606 is programmable via pipelined control bits ("controls in") that are received from the sequencer function.

INPUTS:

| | |
|---|---|
| controls in | function control bits from sequencer |
| input data | data vector input from another computation cell |
| y data in | intermediate (y) vector input from MFRAM 604 |
| q data in | previously calculated rotation control data from MFRAM 604 or another computation cell (via a backsolve control packet). |

OUTPUTS:

| | |
|---|---|
| controls out | function control bits after pipeline delays |
| data out | data output to MFRAM 604 |
| q data out | rotation controls to MFRAM 604 |

The rotation engine 606 includes four main sub-functions, the circular rotation pipeline 6062, the circular/hyperbolic rotation pipeline 6064, the Cholesky matrix storage 6066, and the Q data skewer/deskewer 6068.

Also included as part of the rotation engine 606 are data path multiplexer circuits 6070, 6072, 6074 and 6076. The data multiplexer function 6070 selects between input data (from outside the computation cell) and y-data (from the MFRAM 604), under control of a function control bit. The QIN multiplexer 6072 selects between skewed rotation control data from the rotation pipelines 6062 and 6064 and parallel Q data from the MFRAM 604, and applies the selected data to the Q data skewer/deskewer 6068. The QOUT multiplexer 6074 selects between a normal and bit-reversed Q data output from the Q data skewer/deskewer function 6068 to be passed to the MFRAM function 604. The Cholesky output multiplexer 6076 selects between the output of the Cholesky matrix storage 6066 and a representation of the identity matrix from the identity matrix generation block 6076, under the control of a function control bit. The selected input is passed to the circular/hyperbolic rotation pipeline 6064. The substitution of the identity matrix for the Cholesky matrix is necessary to support parts of the backsolve process.

CHOLESKY FACTOR STORAGE

The CHOLESKY FACTOR STORAGE is used to store two or more columns of the triangular Cholesky factor matrix. It includes a RAM and a programmable address generator. The address generator generates the address for the RAM, and it can be initialized, incremented or decremented based on information provided by the function control bits. The RAM can be commanded to perform a read operation or a write operation, at the location specified by the programmable address generator.

The CHOLESKY FACTOR STORAGE is controlled by function control bits that are received from both the circular rotation pipeline 6062 and the circular/hyperbolic rotation pipeline 6064. These control bits are initially generated by the sequencer 602 function, and are passed through the control pipeline registers of the rotation pipelines to maintain alignment with the data. The specific function control bits used by the CHOLESKY FACTOR STORAGE are:

| | |
|---|---|
| VALID | indicates that data is valid |
| HEADER | indicates start of vector |
| FREEZE | hold address counter |
| UPDATE | write data into RAM (default = read data) |
| DECR | address counter count-down mode |

Q DATA SKEWER / DESKEWER

The Q data skewer/deskewer 6068 is used to transform the parallel Q data into the skewed rotation controls that are needed by the rotation pipeline and vice-versa. The parallel Q data is normally received from one of the QRAMS located in the MFRAM block 604. The Q data is composed of 2S bits of parallel data (S is the number of stages in each rotation pipeline) where each bit of data represents a plus or minus rotation control setting that is to be applied to a particular data vector as it progresses through the rotation pipeline.

For example, in the case of a 10 stage rotation pipeline, the Q data would be 20 bits wide. Bit 1 of the Q data (the LSB) corresponds to the rotation control setting for stage 1 (the first stage) of the first (the circular) rotation pipeline. Bit 2 of the Q is the rotation control setting for the second stage, etc. Since the vector that is to be rotated is passed through the rotation stages in a pipelined fashion, the second rotation stage will need its rotation control for this vector one clock later then the first stage. And the third stage needs its rotation control one clock later still. And so on. The Q data skewer/deskewer 6068 performs this function of inserting an incremental pipeline delay across the Q data word, producing correctly time-aligned rotation controls to be applied to the rotation pipelines. It also performs a reverse function, where skewed rotation controls are produced by the rotation pipelines (in response to a set controls mode of operation) and must be de-skewed into a parallel form in order to be written into one of the QRAMS within the MFRAM block 604.

ROTATION PIPELINES

The rotation pipelines 6062 and 6064 perform the vector rotation functions the are necessary to support both the Cholesky factor update operation and the backsolve operation. The main function performed is the iterative rotation of a vector (which can be thought of as complex number). There are two versions of this rotation. The first version computes a set of rotation controls (which correspond to a rotation angle) such that the imaginary portion of the input vector is set to zero. The second version of the vector rotation is the application of previously set rotation controls to a (different) input vector, which in general will result in non-zero values for both the real and imaginary outputs. Within each of these two main rotation versions (set and apply) there are two rotation types, circular and hyperbolic. Circular vector rotations are used to update the Cholesky factor with the information contained in a new sample vector. Hyperbolic vector rotations are used to downdate the Cholesky factor, that is, to remove the information contained in a previous sample vector from the Cholesky factor. The rotation pipelines 6062, 6064 can also perform several other support functions unrelated to vector rotation.

The rotation pipelines 6062, 6064 perform the following specific operations, based on the function control bits:

CIRCULAR VECTOR ROTATION. Rotate vectors using a circular CORDIC rotation. This operation is used to update the Cholesky Factor with a new sample vector.

HYPERBOLIC VECTOR ROTATION. Rotate vectors using a hyperbolic CORDIC rotation. This operation is used to downdate the Cholesky factor, essentially removing a sample vector's contribution from the Cholesky factor.

PASS DATA, STRAIGHT. Data is passed through the ROTATION PIPELINE unaltered. This mode is necessary to support Cholesky factor read and load operations for the theta CORDIC rotation cell.

PASS DATA, DIAGONAL. Data is passed from one input to both outputs. This mode supports Cholesky factor load operations.

PASS DATA, CROSS. Data from the inputs are passed to the opposite outputs in a criss-cross manner. This mode supports Cholesky factor read operations.

CORRECTION FACTOR LOAD. Data is loaded into the control registers of the programmable correction factor.

SET ROTATION CONTROLS. Rotate a vector such that the resultant imaginary component of the vector is zero, and store the rotation controls that were computed to perform this rotation.

The ROTATION PIPELINES are controlled by the following function control bits

| VALID | indicates that data is valid |
| HEADER | indicates start of vector |
| LEADER | set rotation controls to zero leader |
| CIRCULAR | set data path to circular rotation mode |
| PASS | pass data unaltered |
| CROSS | pass data in criss-cross manner |
| DIAG | pass data from input to both outputs |
| UPDATE | Update (write to) Cholesky factor |
| CONFIG | load programmable correction factor from data |
| CONJ | conjugate the output data |

IMPLEMENTATION—ROTATION PIPELINE DESCRIPTIONS

CIRCULAR ROTATION PIPELINE 6062

Figure 10:
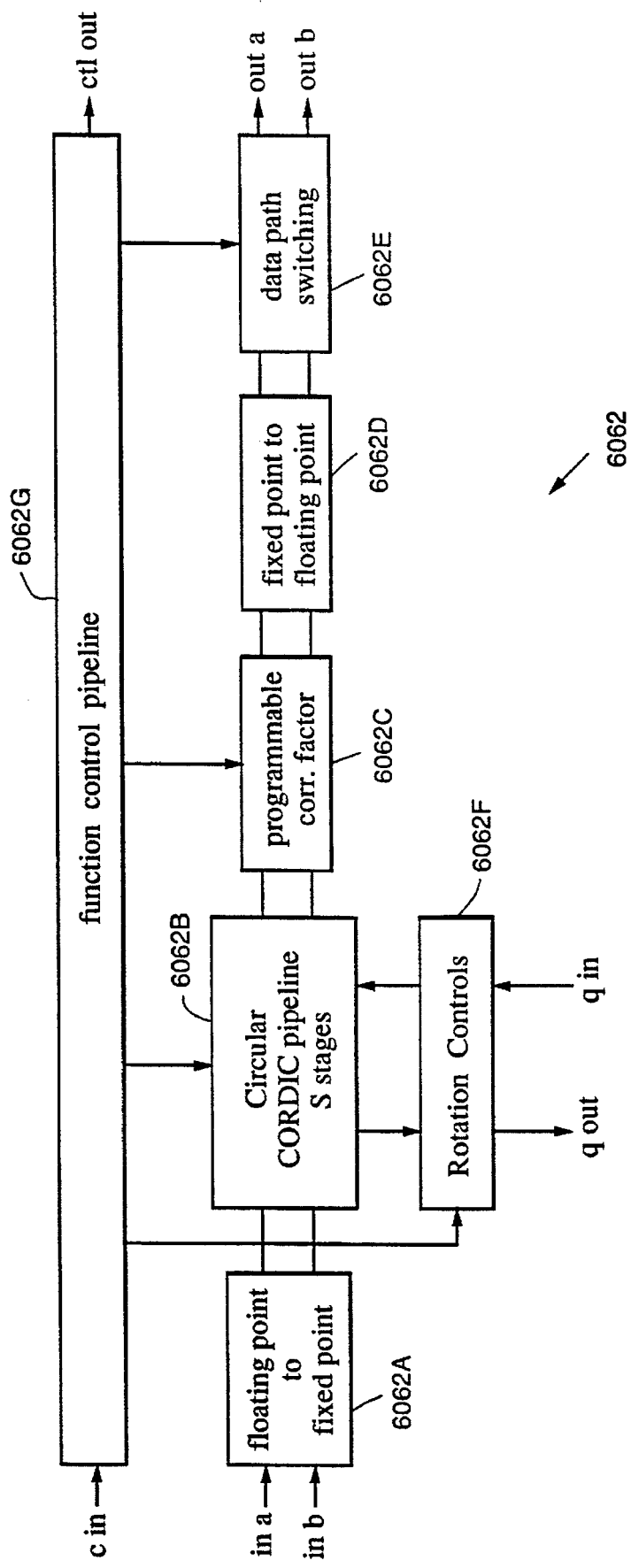
FIG. 10 is a schematic block diagram of a circular rotation pipeline comprising the linear array of FIG. 6.

FIG. 10 illustrates an exemplary implementation of the circular rotation pipeline 6062. This pipeline includes the following inputs and outputs:

| INPUTS: | |
|---|---|
| ctl in | function control bits |
| in a | the real component of input vector |
| in b | the imaginary component of input vector |
| q in | previously calculated rotation control data. |

| OUTPUTS: | |
|---|---|
| ctl out | function control bits after pipeline delay |
| out a | the real component of rotated vector |
| out b | the imaginary component of rotated vector |
| q out | rotation control bits as determined by a vector rotation operation |

The circular rotation pipeline 6062 supports the Cholesky Factor computations and the backsolve computations through a process of 'zeroing out' the data vectors that are applied to it in the course of these computations via the CORDIC algorithms. The rotation pipeline 6062 is programmable via pipelined control bits ("controls in") that are received from the sequencer function 602. The rotation pipeline function 6062 includes several main elements, floating point to fixed point conversion 6062A, CORDIC pipeline 6062B, programmable correction factor 6062C, fixed point to floating point conversion 6062D, data path switching 6062E, rotation control storage 6062F, and function control pipeline 6062G.

The floating point to fixed point conversion function 6062A converts the IEEE floating point number representation that is used external to the rotation pipeline into the B bit fixed point representation that is used internal to the rotation pipeline. The exponent of each of the two floating point input numbers is examined, and the smaller magnitude number is adjusted (the mantissa is shifted right) such that the exponents become equal.

The circular CORDIC pipeline 6062B includes S CORDIC rotation stages connected together in a pipelined manner, that is, the output of one CORDIC stage is connected to the input of the next CORDIC stage. The design of a CORDIC rotation stage is well known, and consists primarily an B bit wide adder/subtractor function and a optional pipeline register. It is controlled by function control bits from the function control pipeline 6062G.

The programmable correction factor 6062C adjusts the length of the rotated vector after it has passed through the CORDIC pipeline 6062B. In the case of a circular rotation, the correction factor is less than one, indicating the vector length will be reduced. The correction factor is programmable, to allow for the incorporation of a forgetting factor into the correction factor. A forgetting factor is a method of gradually reducing the effect of older data in relation to newer data. It is controlled by function control bits from the function control pipeline 6062G.

The fixed point to floating point conversion function 6062D converts the internal fixed point representation of data into the IEEE floating point representation that is used outside the rotation engine. Each number is normalized (shifted) independently such that its mantissa is between one and two, with the exponents adjusted accordingly.

The data path switching function 6062E performs the output data switching necessary to support the CROSS, PASS, and DIAGONAL modes of rotation engine operation.

It is controlled by function control bits from the function control pipeline 6062G.

The rotation controls function 6062F serves to store the rotation controls that are used to control the CORDIC pipeline 6062B. This function can accept external skewed rotation controls from the q_in input for application to the CORDIC pipeline 6062B. In the case where the rotation engine 606 is commanded to set its own rotation controls, the rotation controls function will accept skewed rotation controls produced by the CORDIC pipeline 6062B. These controls will then be passed to the q_out output.

The function control pipeline 6062G is a series of pipeline registers that serve to keep the programmable function control bits aligned to the data as the data (vector) is passed through the circular CORDIC rotation pipeline. Various function control bits are tapped off of the pipeline at the appropriate places to control the CORDIC pipeline 6062B, the programmable correction factor 6062C, the rotation controls function 6062F, and the data path switching function 6062E.

CIRCULAR / HYPERBOLIC ROTATION PIPELINE 6064

Figure 11:
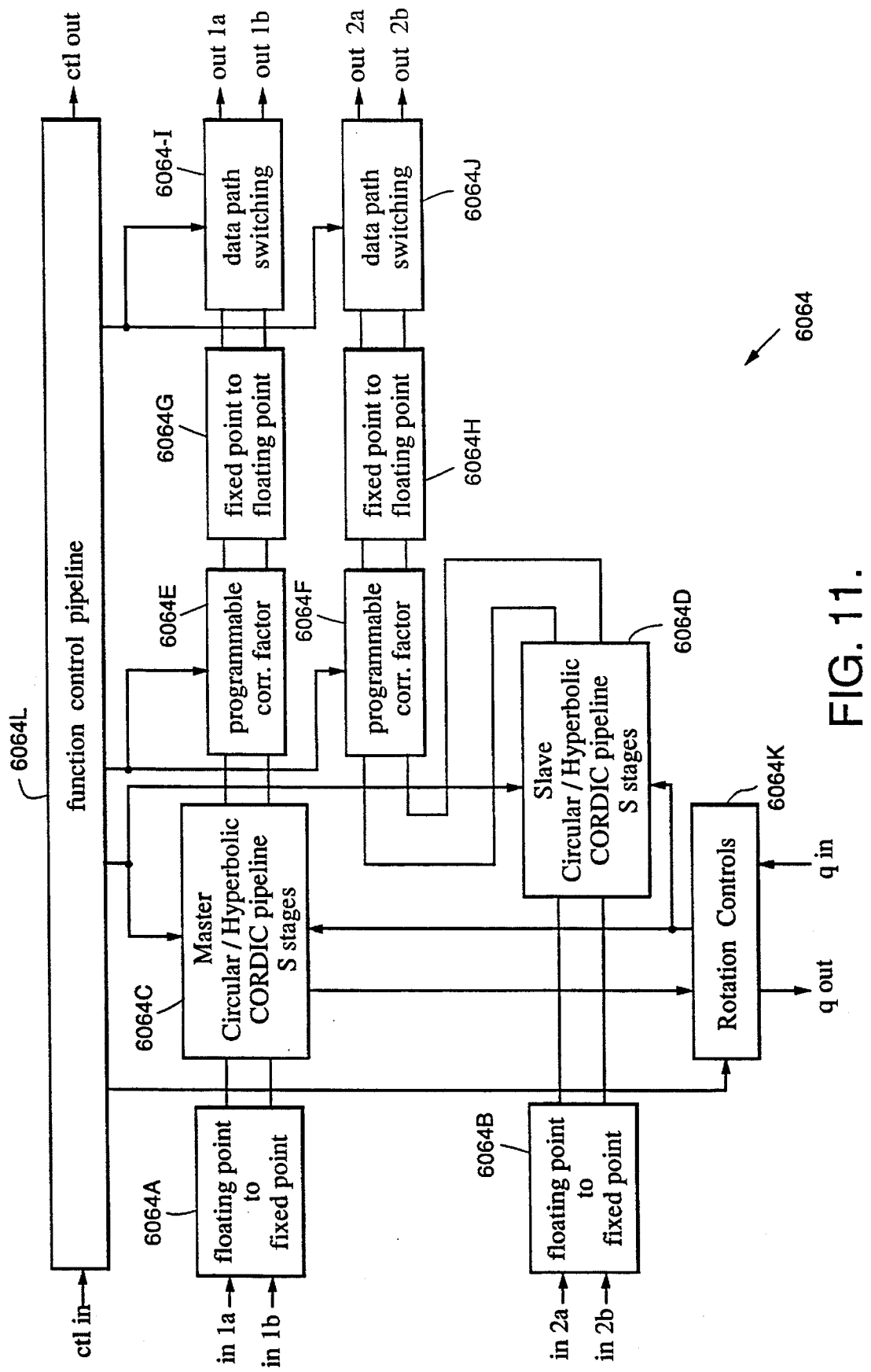
FIG. 11 is a schematic block diagram of a circular/hyperbolic rotation pipeline comprising the linear array of FIG. 6.

An exemplary implementation of this rotation pipeline 6064 is shown in FIG. 11, and has the following inputs and outputs.

INPUTS:

| | |
|---|---|
| ctl in | programmable function control bits |
| in 1a | the real component of input vector 1 |
| in 1b | the imaginary component of input vector 1 |
| in 2a | the real component of input vector 2 |
| in 2b | the imaginary component of input vector 2 |
| q in | previously calculated rotation control data. |

OUTPUTS:

| | |
|---|---|
| ctl out | programmable function control bits after pipeline delay |
| out 1a | the real component of rotated vector 1 |
| out 1b | the imaginary component of rotated vector 1 |
| out 2a | the real component of rotated vector 2 |
| out 2b | the imaginary component of rotated vector 2 |
| q out | rotation control bits as determined by a vector rotation operation |

The circular/hyperbolic rotation pipeline 6064 supports the Cholesky Factor computation and the backsolve computation through a process of 'zeroing out' the data vectors that are applied to it in the course of these computations. This rotation engine is similar to the circular rotation pipeline 6062, but differs in two ways. First, the circular/hyperbolic rotation pipeline has special logic to support both hyperbolic Cholesky factor downdate operations which is not required in the circular rotation pipeline. Second, the circular/hyperbolic rotation pipeline 6064 actually includes two rotation pipelines connected in a master/slave configuration. Both pipelines respond to the same function control bits, but only one pipeline, the master, can be used to set rotation controls. The rotation controls that are set by the master pipeline are automatically applied to the slave pipeline when internal rotation controls are selected. When external rotation controls are selected, both pipelines receive the same rotation controls.

The circular/hyperbolic rotation pipeline is programmable via pipelined control bits (controls in) that are generated by the sequencer function 602. The rotation pipeline 6064 includes several main elements, including floating point to fixed point conversion functions 6064A and 6064B, a master circular/hyperbolic CORDIC pipeline 6064C, a slave CORDIC pipeline 6064D, programmable correction factor functions 6064D and 6064F, fixed point to floating point conversion functions 6064H, data path switching functions 6064I and 6064J, rotation control storage function 6064K, and function control pipeline 6064L.

The floating point to fixed point conversion functions 6064A and 6064B each converts the IEEE floating point number representation that is used external to the rotation pipeline into the B (B=word width) bit fixed point representation that is used internal to the rotation pipeline. The exponent of each of the two floating point input numbers is examined, and the smaller magnitude number is adjusted (the mantissa is shifted right) such that the exponents become equal.

The master CORDIC pipeline 6064C includes S CORDIC rotation stages connected together in a pipelined manner, that is, the output of one CORDIC stage is connected to the input of the next CORDIC stage. Certain stages within the CORDIC pipeline have a multiplexer function inserted into the data path to support the conversion of the pipeline from a circular rotation mode to a hyperbolic rotation mode. It is controlled by function control bits from the function control pipeline 6064L.

The slave CORDIC pipeline 6064D is identical to the master pipeline 6064C, with the exception that the slave pipeline has no capability to set its own rotation controls. It always uses rotation controls supplied by the rotation control block 6064K.

The programmable correction factor functions 6064E and 6064F each adjusts the length of the rotated vector after it has passed through the respective CORDIC pipeline. In the case of a circular rotation, the correction factor is less than one, indicating the vector length will be reduced. In the case of a hyperbolic rotation, the correction factor is greater than one. The function blocks 6064E and 6064F each can store two correction factors, one for circular rotations, and one for hyperbolic rotations. Both correction factors are programmable, to allow for the incorporation of a forgetting factor into the correction factor. It is controlled by function control bits from the function control pipeline 6064L.

The fixed point to floating point conversion functions 6064G and 6064H each converts the internal fixed point representation of data into the IEEE floating point representation that is used outside the rotation engine. Each number is normalized (shifted) independently such that its mantissa is between one and two, with the exponents adjusted accordingly.

The data path switching functions 6064I and 6064J functions each performs the output data switching necessary to support the CROSS, PASS, and DIAGONAL modes of rotation engine operation. It is controlled by function control bits from the function control pipeline 6064L.

The rotation controls function 6064K serves to store the rotation controls that are used to control the circular/hyperbolic CORDIC PIPELINE 6064C and 6064D. The function 6064K can accept external skewed rotation controls from the q_in input for application to the CORDIC pipeline. In the case where the rotation engine is commanded to set its own rotation controls, the rotation controls function will accept skewed rotation controls produced by the circular/hyperbolic CORDIC pipeline 6064C and 6064D. These controls will then be passed to the q_out output.

The function control pipeline 6064L is a series of pipeline registers that serve to keep the programmable function control bits aligned to the data as the data (vector) is passed through the rotation pipeline. Various function control bits are tapped off of the pipeline at the appropriate places to control the CORDIC pipelines 6064C and 6064D, the programmable correction factor functions 6064E and 6064F, the rotation controls function 6064K, and the data path switching functions 6064I and 6064J.

Microcode Sequencer Flow Diagrams.

Figure 12:
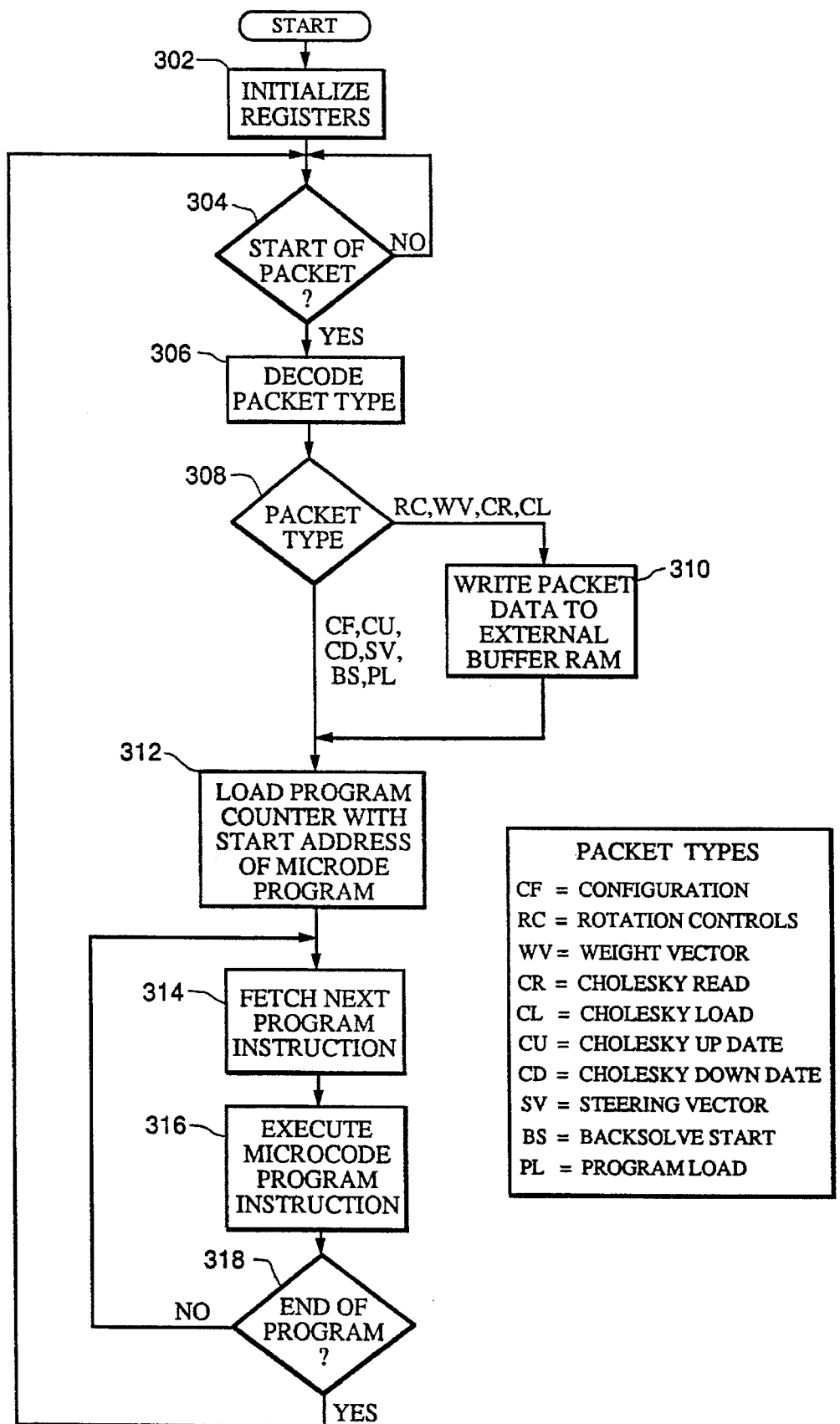
FIG. 12 is a flow diagram illustrating operation of the microcode sequencer comprising the computation cells.

An exemplary microcode sequencer 602 flow diagram is shown in FIG. 12. Upon startup, the sequencer initializes its internal registers to known states (302). It then begins checking for the start of a packet (304). When a packet is detected (306), the packet type is decoded from the header. If the packet is a rotation controls (RC), weight vector (WV), Cholesky read (CR), or Cholesky load (CL) packet (308), it is routed to the external buffer RAM in the MFRAM block 604 where it is temporarily stored (310).

The program counter is then loaded with the start address of the program segment corresponding to the decoded packet type (312). The sequencer 602 then fetches (314) and executes instructions (316) until the end of the program segment is reached (318). At this point, the sequencer completes the program execution and begins checking for the start of another packet (304).

Microcode Program Flow.

The microcode program includes program segments, each corresponding to a given packet type. There are several packet types that are essential to perform the entire weight vector generation process. These are discussed below and flow diagrams of the program segments are provided. These other packet types utilize similar instructions and perform similar operations. Since the microcode program store may be programmed externally, these flow diagrams are of an exemplary nature only of the many possible variations.

Configuration Packet Program Segment Flow Diagram.

Figure 13:
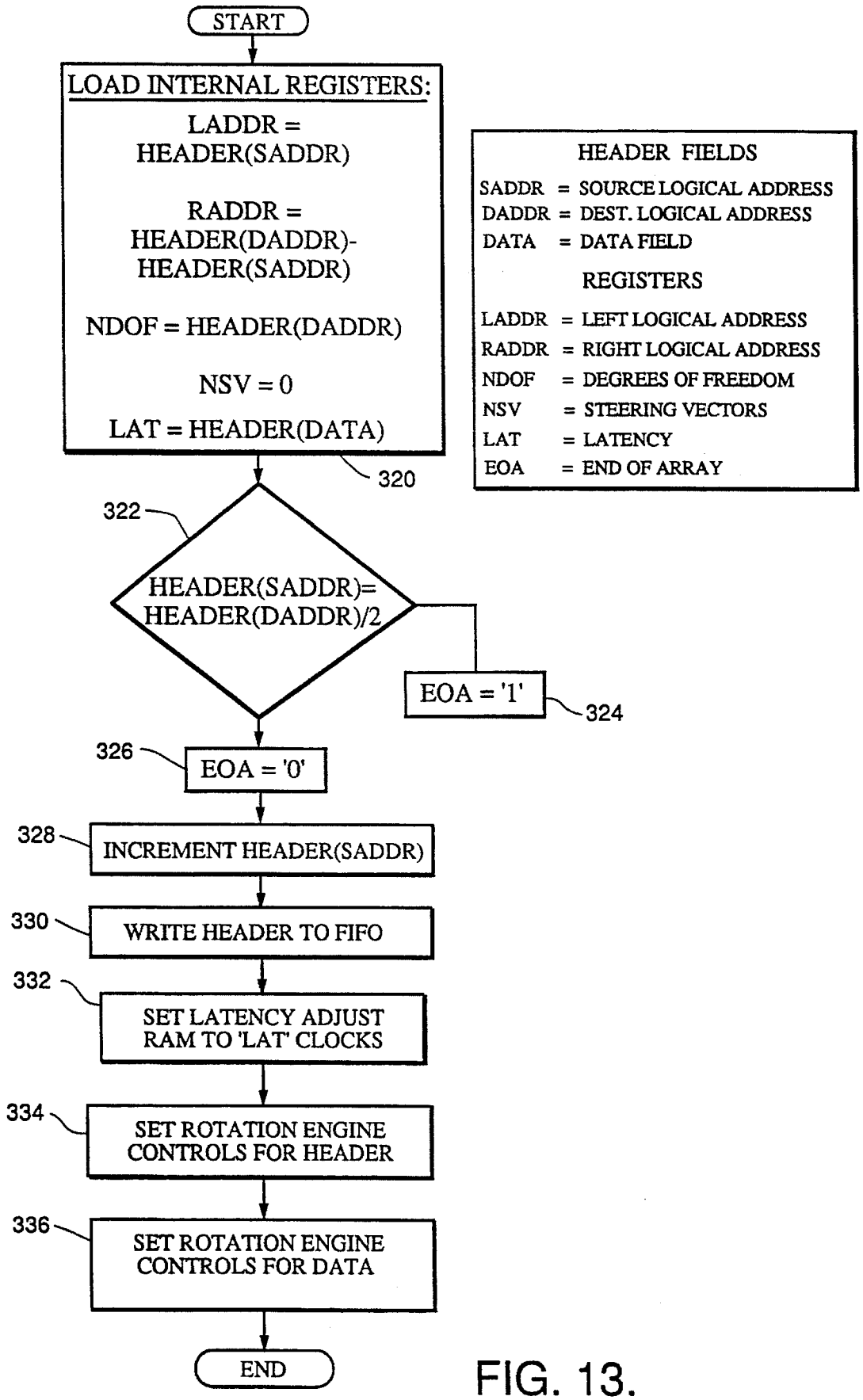
FIG. 13 is a flow diagram illustrating a configuration packet program segment of the microcode program.

An configuration packet program segment flow diagram is shown in FIG. 13. The program first loads the internal registers based on data in the configuration packet header fields (320). The header source address field is then compared to the destination fields divided by two (322). If the result of the comparison evaluates to true, the end-of-array (EOA) bit is set (324). If the result of the comparison evaluates to false, the EOA bit is cleared (326), the source address of the header is incremented (328), and the header is written to the FIFO 614 (330). The latency RAM in the MFRAM block 604 is then set to the value set in the LAT register (332). This sets the latency of the computation cell for proper interleaving for the specified DOF problem size. The rotation engine controls are then set for the header and data word of the configuration packet as it enters the pipeline (334,336). When the configuration data word emerges from the latency RAM, it will be sent to the next computation cell along with the header in the FIFO as a new configuration packet.

Cholesky Update/Downdate Packet Program Segment Flow Diagram.

Figure 14:
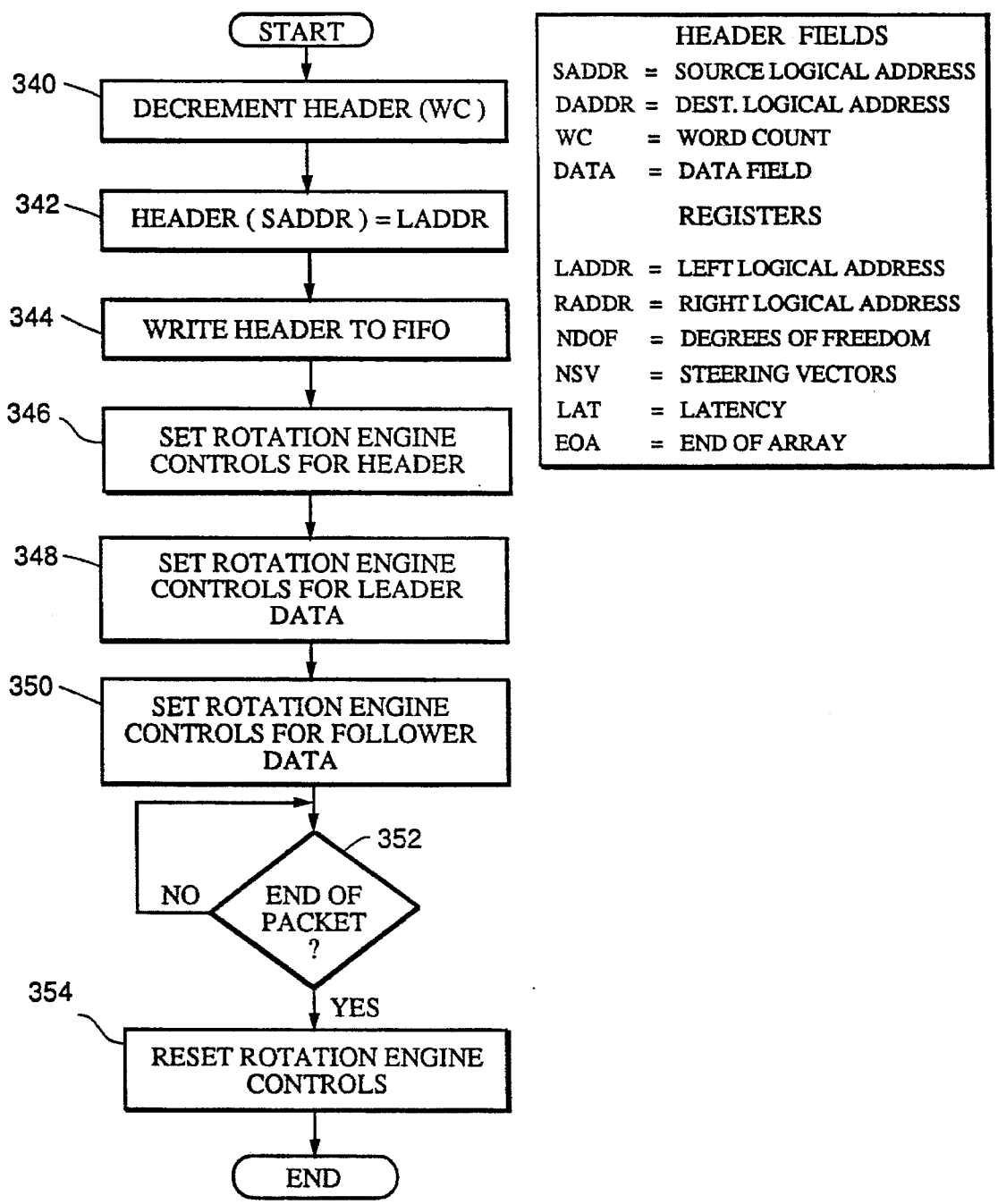
FIG. 14 is a flow diagram illustrating a Cholesky update/downdate packet program segment of the microcode program.

The Cholesky update/downdate packet program segment flow diagram is shown in FIG. 14. The word count field of the header is decremented (340) to account for the leader data to be zeroed out (resulting in a packet one less in length). The source address field is set to the left logical address of the computational cell receiving the packet (342). The header is then written to the FIFO (344). The rotation engine controls are then set for the header, leader, and follower data as it propagates through the pipeline (346, 348, 350). The program then waits for the end of the packet (352), at which time it resets the rotation engine controls to a benign state (354). As the data and controls emerge from the latency RAM, the header is read from the FIFO and sent to the next computation cell along with the processed data.

Cholesky downdate packets are processed identically to the update packets with the exception that the rotation engine control bits are set differently.

Steering Vector Packet Program Segment Flow Diagram.

Figure 15:
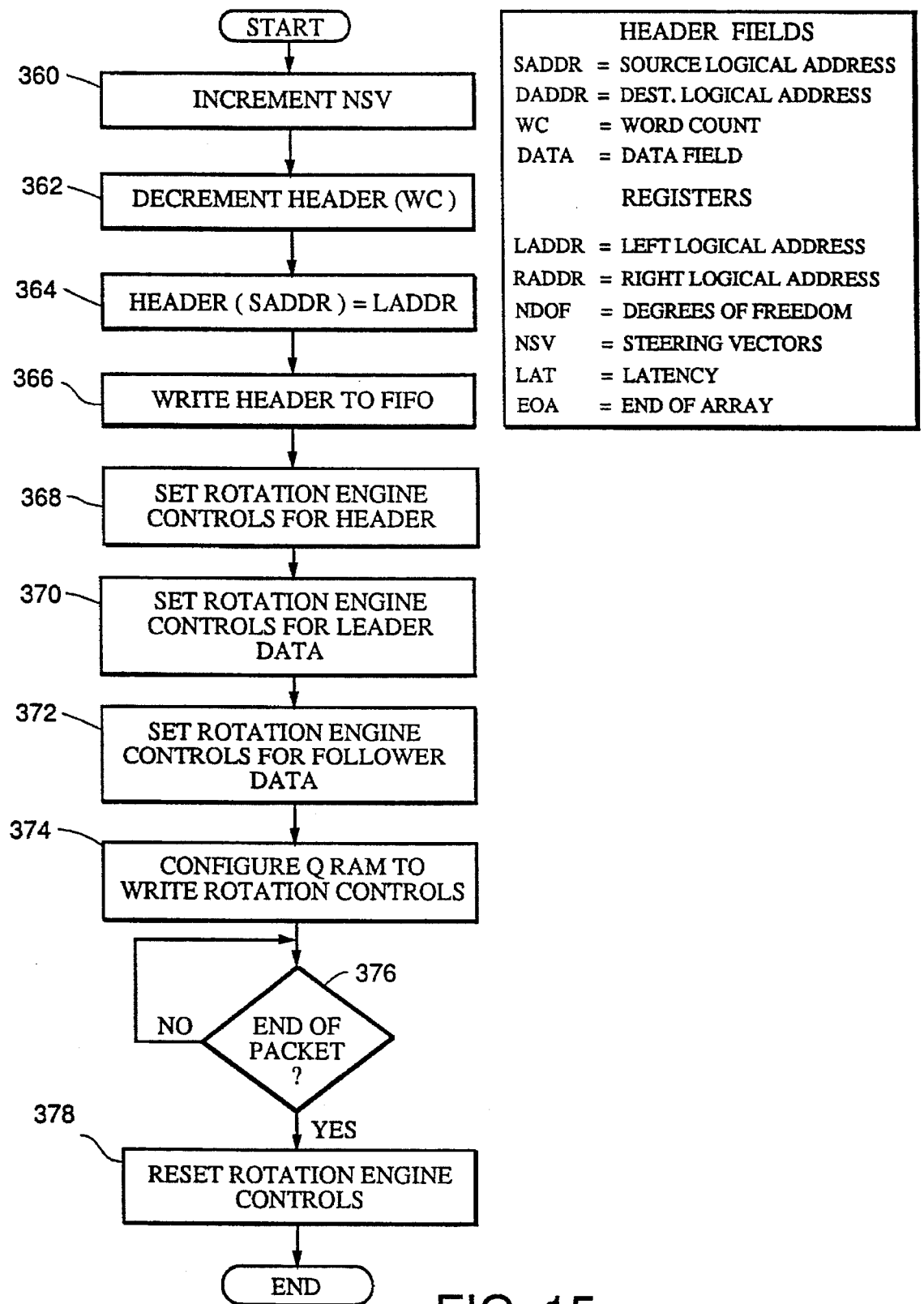
FIG. 15 is a flow diagram illustrating the steering vector packet program segment of the microcode program.

The steering vector packet program segment flow diagram is shown in FIG. 15. This program is identical to the Cholesky update program with the exception that the steering vector counter (NSV) is incremented (360) and the rotation controls (Q) produced by the zeroing out of the leading data element are stored in the Q RAM where they will be used in the backsolve process (374). Otherwise steps 362–372 and 376–378 of FIG. 15 correspond to steps 340–354, respectively, of FIG. 14.

Backsolve Start Packet Program Segment Flow Diagram.

When a backsolve start packet is received, it is propagated to the next computation cell in the array, unless it is the last cell. The microcode sequencer 602 then executes a long program segment that performs all four algorithms (0–3) in order to produce final weight vector packets.

Figure 16A:
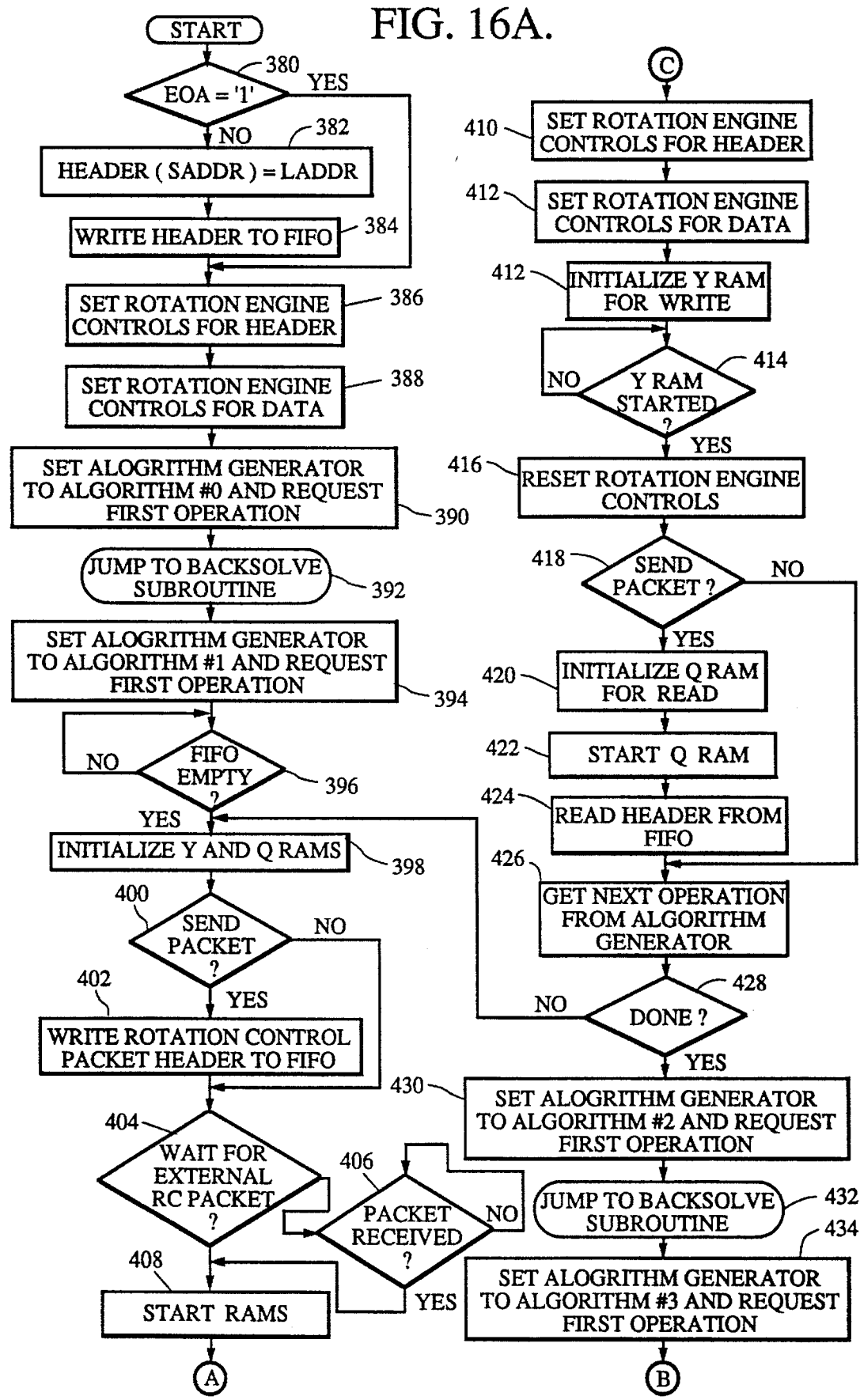
FIGS. 16A, 16B and 16C are flow diagrams illustrating the backsolve start packet program segment of the microcode program.
Figure 16B:
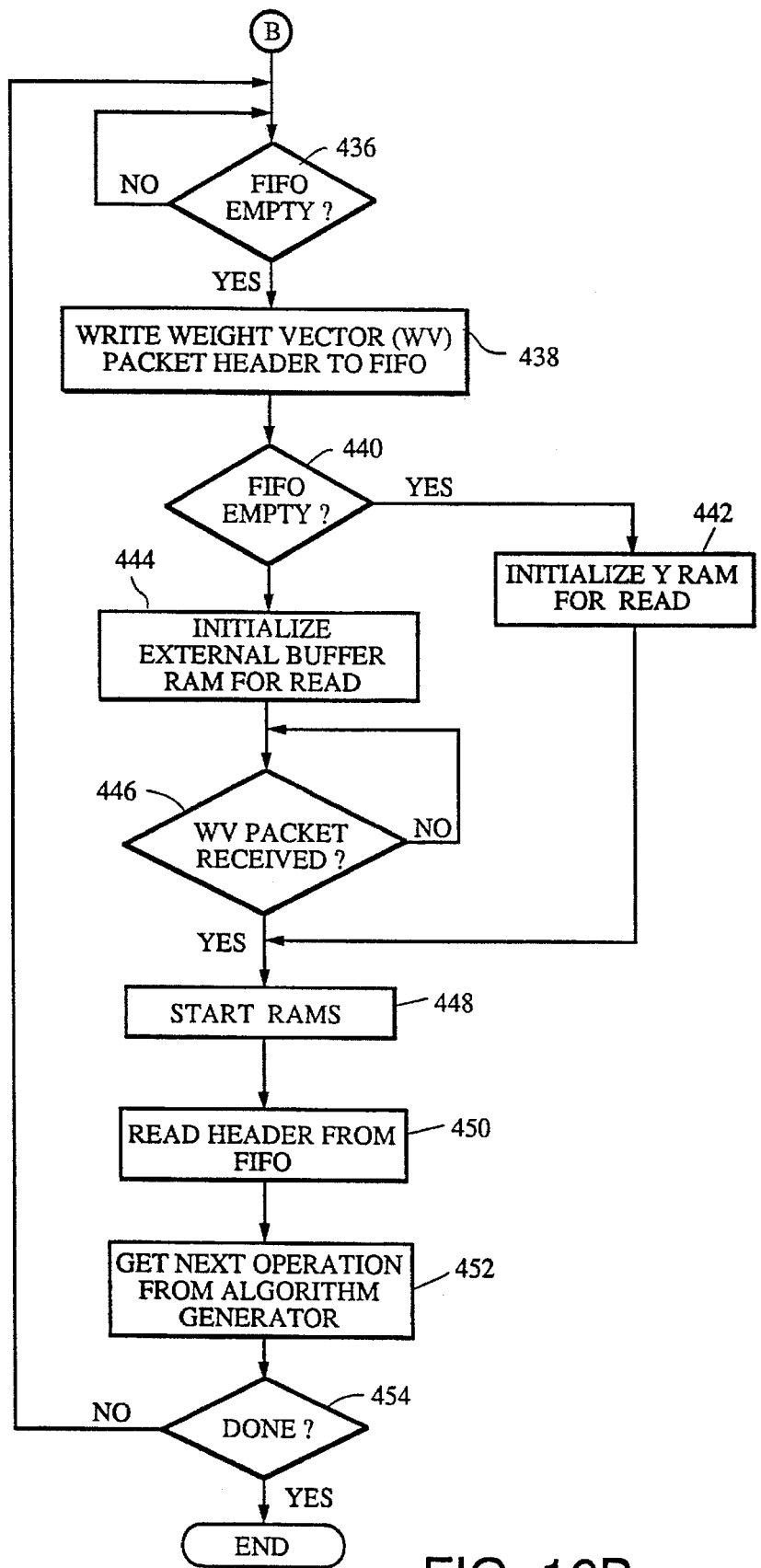
Figure 16C:
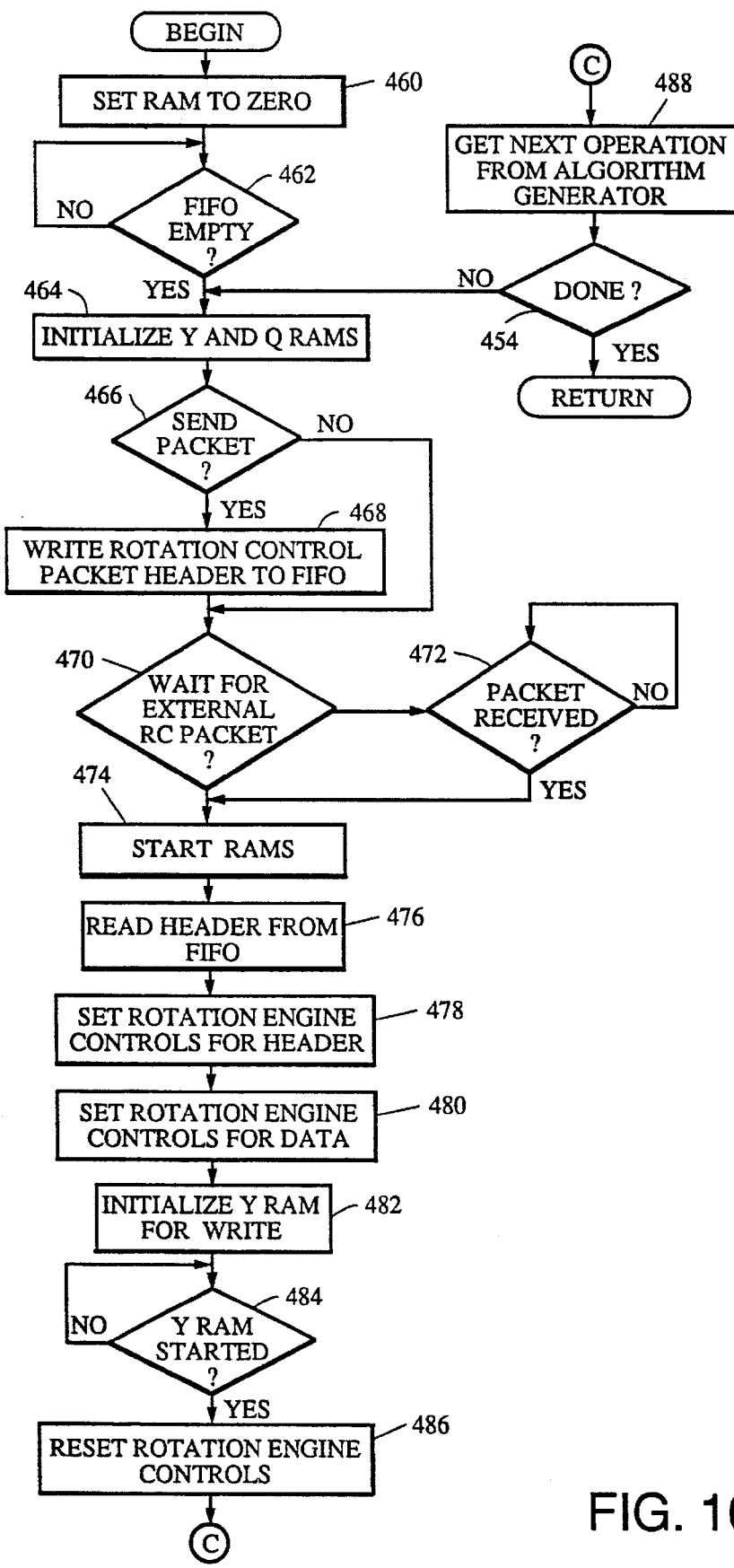

The backsolve start packet program segment flow diagram is shown in FIG. 16. Upon receipt of a backsolve start packet, the sequencer determines (380) if it is the last cell in the array. If this is not the case, a header is written to the FIFO with the source address (SADDR) set to the left logical address (LADDR) of the computation cell (382, 384). The rotation engine controls are then set to the appropriate values for the header and data (386, 388).

The algorithm generator is then configured for algorithm zero and the first operation is requested (390). This algorithm generates the intermediate Y values from the Q's stored during the steering vector packets. After requesting the first operation, the program jumps to the backsolve subroutine described below (392). After returning from the backsolve routine, the algorithm generator is configured for algorithm one and the first operation is requested (394). This algorithm zeroes out the intermediate Y values and stores a new set of Q's to be used to generate the final results (weight vectors). After requesting the first operation, the program waits (396) for the FIFO to empty, indicating that the pipeline is empty. The Y and Q RAMS in the MRFRAM block are then initialized (398) for read or write operations based on the operation specified by the algorithm generator block. If the program is supposed to send a rotation control packet (400) to a neighboring computation cell (as instructed by the algorithm generator block), it writes the appropriate header to the FIFO (402). The program waits for an external rotation control packet if instructed to do so by the algorithm generator block (404). When the packet is received, the configured RAMS are started (408) and the appropriate rotation controls are set for the header and data (410, 412).

While the data from the Y RAM is propagating through the rotation engine pipeline, the program configures the Y Ram to store the results (412). The program then waits for the Y Ram to begin writing the results (414). The rotation engine controls are then reset (set to a benign state) at 416. If a rotation control packet is to be sent to a neighboring computation cell (418), then the Q RAM is initialized for a read operation (420) and started (422). The header is then read from the FIFO at the appropriate time (424) so that a packet is formed at the output.

The program then requests the next operation from the algorithm generator block (426). If this is not the last operation for this algorithm (428), the program returns to 398 where the Y and Q RAMS were initialized. This loop is repeated until all operations for algorithm one are complete.

When algorithm one is complete, the algorithm generator is configured for algorithm two and the first operation is requested (430). This algorithm produces the final results (weights) from the Q's stored during the previous step. The results are stored in the Y RAM where they are extracted during the next step. After requesting the first operation, the program jumps (432) to the backsolve subroutine.

After returning from the backsolve subroutine, the algorithm generator is configured for algorithm three and the first operation is requested (434). This algorithm extracts the final result and forms weight vector packets that are sent to the first computation cell in the array and finally to the host system. After requesting the first operation, the program waits for the FIFO to empty (436), indicating that the pipeline is empty. A weight vector packet header is then written to the FIFO (438). The external buffer RAM or local Y RAM is configured for a read operation based on the information supplied by the backsolve generation block. If the external buffer RAM was selected (444), the program waits (446) until an external weight vector packet is received and propagates it along to the computation cell to its left (448, 450). If the Y RAM was selected (440), a weight vector packet is generated from the data stored in the Y RAM (442) and sent to the computation cell to its left (448, 450).

The program then requests the next operation from the algorithm generator block (452). If this is not the last operation for this algorithm, the program returns to 436, where it waits for the FIFO to empty and repeats the entire loop until all operations for algorithm three are complete (454). The backsolve algorithm is now complete and the array may begin processing Cholesky update packets again. Backsolve Subroutine Flow Diagram.

The backsolve subroutine generates either intermediate Y values or final results (weights) from the Q's stored in the Q RAM. The program first clears out the Y RAM by setting each location to zero (460). The program then waits (462) for the FIFO to empty, indicating that the pipeline is empty. The Y and Q RAMS are initialized based on information from the algorithm generator block (464). If a rotation control packet is to be sent (466), then a header is written to the FIFO (468). If the program is expecting an external rotation control packet (as determined by the algorithm generator block), it waits for the external buffer RAM to receive a rotation control packet (470). The configured RAMS are then started (474) and a header read from the FIFO (476) if a packet is to be sent. The rotation engine controls are then set for the header (478) and the data (480). While the data is propagating through the pipeline, the Y RAM is configured to store the results (482). When the results are stored (484), the rotation engine controls are reset (486).

The program then requests the next operation from the algorithm generator block (488). If this is not the last operation for this algorithm, the program returns to 464 and repeats the entire loop until all operations for this algorithm are complete (490). The program then returns from the subrouting to the instruction following the calling instruction.

The subject invention can be implemented as a signal processing array that is used to perform extremely high throughput (100s of GFLOPS) matrix arithmetic operations on linear systems of equations in real time. In particular, it very efficiently computes optimal least squares solutions to overdetermined linear systems. The array physically consists of a linear systolic array of computation cells; each computation cell is composed of several vector rotation stages. These rotation stages allow efficient implementations of a variety of matrix algorithms. The computation cells are fully programmable to provide this flexibility. All data movement between cells is via parameterized data packets, and the full linear systolic array is completely data flow driven at the packet level. Physical computation cells can be mapped to act as one or more logical computation cells, allowing a small array to function logically as a larger array through a logical 'folding' method. This mapping also allows defective cells to be bypassed for fault tolerance.

A key aspect of the invention is that, although it can be implemented as a systolic array highly optimized for the above-mentioned matrix operations, the array retains the flexibility of a programmable data-flow system, allowing efficient implementation of many different algorithms. This provides flexible matrix processing capabilities that are one to three orders of magnitude less expensive and more dense than the current state of the art, and more importantly, allows a realizable solution to matrix processing problems that were previously considered impractical to physically implement.

The subject invention is extremely flexible and offers efficient (as measured in FLOPS/watt or MFLOPS/cu.in. or FLOPS/$) that range from 10 times to 1000 times better than the programmable DSP approach. (A FLOP is a floating point operation per second measure.)

For example, consider a sampled data application equivalent to 2500 equations with 500 unknowns with an input data rate of 50 Mhz. This is analogous to a 500 channel adaptive beamforming radar system. This type of problem requires about 150 GFLOPS (billions of floating point operations per second) to solve in real time. This amount of processing power can be provided by the subject invention at a cost of about $100,000, and a power consumption of about 500 watts, and a physical size measured in tens of cu. in. If, instead, one used the current state of the art in programmable processing technology (such as DSP chips), the cost would be approximately five to ten million dollars, and the power consumption would be at least 30,000 watts, with a physical size measured in the tens of cu. ft.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A programmable processor system for performing extremely high throughput matrix arithmetic operations on linear systems of equations in real time, said processor system comprising a linear systolic array of computation cells, each cell comprising a plurality of vector rotation stages, and programmable means responsive to configuration data to configure respective cells according to said configuration data, said configuration data determining which cells are operational during said matrix arithmetic operations, where in said linear array is programmable in operational cell length, wherein said computation cells are programmably arranged in a folded arrangement wherein data is passed successively through a programmable under of said cells in a first direction and back through said cells in a second direction in a time interleaved manner, and wherein said cells further include programmable latency delay means for delaying transfer of data between cells in order to achieve proper interleaving of said data for different operational array lengths, said configuration data further includes latency programming data, said programmable latency delay means responsive to said latency programming data to set said delay means in accordance with said latency programming data.

2. The system of claim 1 wherein data connections between adjacent ones of said computation cells are local connections, wherein said system does not require a global data bus interconnecting said computation cells.

3. The system of claim 1 wherein during array operation, all information passed between said computation cells is in the form of packets, and wherein said computation cells comprise means for recognizing and responding to a plurality of different types of packets.

4. The system of claim 3 wherein said packets are in the form of digital data packets and have a structure comprising a header defining said packet type, and one or more data words of a predetermined bit length.

5. The system of claim 4 wherein said data packet types include a configuration packet comprising a configuration header and a data word including said configuration data used to initialize said array prior to data processing.

6. The system of claim 5 wherein each said computation cell comprises means for decoding said packet headers, and means responsive to a decoded packet header indicating said packet is a configuration packet for determining cell addresses, a number of degrees of freedom and correction factors for said rotation stages.

7. The system of claim 3 wherein said matrix arithmetic operations include operations on Cholesky factors, said rotation stages include means for storing Cholesky factor data and means for performing circular/hyperbolic rotations, and said packet types include Cholesky update packets and Cholesky downdate packets, and wherein said array cells comprise means responsive to said Cholesky update packet for zeroing out a leading data element and updating said stored Cholesky factor data, and means responsive to said Cholesky downdate factor to cause said cells to perform circular/hyperbolic rotations on data and downdate said stored Cholesky data.

8. The system of claim 3 wherein said packet types include a constraint vector packet, said constraint vector packet type including constraint vector data used by said array in performance of said matrix arithmetic operations.

9. The system of claim 8 wherein said packet types include a backsolve packet indicating all sample data and constraint vector data has been entered into said array, and said cells comprise means responsive to said backsolve packet to commence operations to solve said equations for an output data vector.

10. The system of claim 1 wherein each said computation cell includes a programmable microcode sequencer for controlling operation of said cell.

11. The system of claim 10 wherein each said cell further includes a multi-function random access memory storage function for providing temporary storage of data under control of said sequencer.

12. The system of claim 1 wherein said configuration data includes a correction factor value, and said programmable means further comprises means responsive to said correction factor value for applying a programmable correction factor to adjust a length of a rotated vector after passing through said rotation stages, said correction factor being programmable to introduce a forgetting factor.

13. The system of claim 1 wherein said vector rotation stages include a circular vector rotation engine and a circular/hyperbolic rotation engine, wherein said processor system provides a capability of performing Cholesky downdating using hyperbolic rotations.

14. An adaptive beamforming system, comprising:

a sensor array for providing sample vectors of sensor sample signals from sensor devices comprising said array;

a source of one or more steering vectors each defining a steering direction;

an initialization device for providing a set of initialization data parameters;

a processor array responsive to said sample vectors, said one or more steering vectors and said set of parameters, said processor array for computing adaptive weights to be applied to said sample vectors for each said steering vector;

means for providing delayed replicas of said sample vectors; and beamforming means for applying said adaptive weights to said delayed replicas of said sample vectors to result in nominally formed beams;

said processor array comprising a linear systolic array of computation cells, each cell comprising a plurality of vector rotation stages, each said computation cell includes a programmable microcode sequencer for controlling arithmetic operation of said cell, and wherein each said cell further includes a multi-function random access memory storage function for providing temporary storage of data under control of said sequencer, said microcode sequencer comprising programmable means responsive to said set of initialization data parameters to configure respective cells according to said set of data parameters so as to control data flow into and out of each said cell, the arithmetic operation of each said cell and the internal storage of data in said random access memory storage function.

15. The system of claim 14 wherein a plurality of said sample vectors are input to said processing array in a serial manner, said computation cells comprise means for computing a voltage domain matrix for said sample vectors, and said processor array comprises backsolving means responsive to said voltage domain matrix and said one or more steering vectors for computing said weight vector for each said steering vector.

16. The system of claim 14 wherein data connections between adjacent ones of said computation cells comprising said processor array are local connections, wherein said processor array does not require a global data bus interconnecting said computation cells.

17. The system of claim 14 wherein during processor array operation, all information passed between said computation cells is in the form of packets, and wherein said computation cells comprise means for recognizing and responding to a plurality of different types of packets.

18. The system of claim 17 wherein said packets are in the form of digital data packets and have a structure comprising a header defining said packet type, and one or more data words of a predetermined bit length.

19. The system of claim 18 wherein said data packet types include a configuration packet comprising a configuration header and a data word including said set of initialization parameter data used to initialize said processor array prior to data processing.

20. The system of claim 19 wherein each said computation cell comprises means for decoding said packet headers, and means responsive to a decoded packet header indicating said packet is a configuration packet for determining cell addresses, a number of degrees of freedom and correction factors for said vector rotation stages.

21. The system of claim 17 wherein said arithmetic operations include operation on Cholesky factors, said vector rotation stages include means for storing Cholesky factor data and means for performing circular/hyperbolic rotations, and said packet types include Cholesky update packets and Cholesky downdate packets, and wherein said processor array cells comprise means responsive to said Cholesky update packet for zeroing out a leading data element and updating said stored Cholesky factor data, and means responsive to said Cholesky downdate factor to cause said cells to perform circular/hyperbolic rotations on data and downdate said stored Cholesky data.

22. The system of claim 17 wherein said packet types include a constraint vector packet type, said constraint vector packet type including constraint vector data used by said array in performance of said matrix arithmetic operations.

23. The system of claim 27 wherein said packet types include a backsolve packet indicating all sample data and constraint vector data has been entered into said array, and said cells comprise means responsive to said backsolve packet to commence said arithmetic operation for an output data vector.

24. The system of claim 23 wherein said packet types further include an output vector packet including said output data vector.

25. The system of claim 14 wherein said computation cells are programmably arranged in a folded arrangement wherein data is passed successively through a programmable number of said cells in a first direction and back through said cells in a second direction in a time interleaved manner.

26. The system of claim 25 wherein said computation cells further include programmable latency delay means for delaying transfer of data between cells in order to achieve proper interleaving of said data, said configuration data further includes latency programming data, said programmable latency delay means responsive to said latency programming data to set said delay means in accordance with said latency programming data.

27. The system of claim 14 wherein said set of initialization data parameters includes a correction factor value, and said programmable means further comprises means responsive to said correction factor value for applying a programmable correction factor to adjust a length of a rotated vector after passing through said rotation stages, said correction factor being programmable to introduce a forgetting factor.

28. The system of claim 14 wherein said vector rotation stages include a circular vector rotation engine and a circular/hyperbolic rotation engine, wherein said processor system provides a capability of performing Cholesky downdating using hyperbolic rotations.

29. A programmable processor system for performing extremely high throughput matrix arithmetic operations on linear systems of equations in real time, said processor system comprising:

a linear systolic array of computation cells, each cell comprising a plurality of vector rotation stages; and programmable means responsive to configuration data to configure respective cells according to said configuration data, said data determining which cells are operational during said arithmetic operations, wherein said linear array is programmable in operational cell length, and wherein during array operation, all information passed between said computation cells is in the form of packets;

said computation cells comprising means for recognizing and responding to a plurality of different types of packets, said packet types including a constraint vector packet type including constraint vector data used by said array in performance of said matrix arithmetic operations, and a backsolve packet type indicating all sample data and constraint vector data has been entered into said array, said cells comprising means responsive to said backsolve packet to commence operations to solve said linear systems of equations for an output data vector.

30. An adaptive beamforming system, comprising:

a sensor array for providing sample vectors of sensor sample signals from sensor devices comprising said array;

a source of one or more steering vectors each defining a steering direction;

an initialization device for providing a set of initialization data parameters;

a processor array responsive to said sample vectors, said one or more steering vectors and said set of parameters, said processor array for computing adaptive weights to be applied to said sample vectors for each said steering vector;

means for providing delayed replicas of said sample vectors; and beamforming means for applying said adaptive weights to said delayed replicas of said sample vectors to result in nominally formed beams;

said processor array comprising a linear systolic array of computation cells, each cell comprising a plurality of vector rotation stages, and programmable means responsive to said set of initialization data parameters to configure respective cells according to said set of data parameters, said set determining which cells are operational during said arithmetic operations, wherein said linear array is programmable in length, said computation cells programmably arranged in a folded arrangement wherein data is passed successively through a programmable number of said cells according to said set of data parameters in a first direction and back through said cells in a second direction in a time interleaved manner, and wherein said cells further include programmable latency delay means for delaying transfer of data between cells in order to achieve proper interleaving of said data, said configuration data further includes latency programming data, said programmable latency delay means responsive to said latency programming data to set said delay means in accordance with said latency programming data.

* * * * *